(12) United States Patent
Iannello et al.

(10) Patent No.: US 12,458,611 B1
(45) Date of Patent: Nov. 4, 2025

(54) STABLE FORMS OF CAPSAICIN PALMITATE FOR THE TREATMENT OF PAIN

(71) Applicant: Chorda Pharma, Inc., Roanoke, VA (US)

(72) Inventors: Victor Iannello, Roanoke, VA (US); Richard D. Carliss, Roanoke, VA (US); Stephan Xander Mattheus Boerrigter, West Lafayette, IN (US)

(73) Assignee: CHORDA PHARMA, INC., Roanoke, VA (US)

( * ) Notice: Subject to any disclaimer, the term of this patent is extended or adjusted under 35 U.S.C. 154(b) by 0 days.

(21) Appl. No.: 18/927,412

(22) Filed: Oct. 25, 2024

(51) Int. Cl.
*A61K 31/165* (2006.01)
*A61K 45/06* (2006.01)
*C07C 233/20* (2006.01)

(52) U.S. Cl.
CPC ............ *A61K 31/165* (2013.01); *A61K 45/06* (2013.01); *C07C 233/20* (2013.01)

(58) Field of Classification Search
CPC ..... A61K 31/165; A61K 45/06; C07C 233/20
See application file for complete search history.

(56) References Cited

U.S. PATENT DOCUMENTS

| | | | |
|---|---|---|---|
| 7,943,666 B2 * | 5/2011 | Singh | A61P 31/12 514/529 |
| 2008/0020996 A1 | 1/2008 | Singh et al. | |
| 2010/0120912 A1 | 5/2010 | Singh et al. | |
| 2011/0039875 A1 | 2/2011 | Singh | |
| 2014/0134261 A1 | 5/2014 | Singh et al. | |
| 2019/0055272 A1 | 2/2019 | Husfeld et al. | |
| 2022/0168259 A1 | 6/2022 | Carliss et al. | |

OTHER PUBLICATIONS

Barden, Single dose oral celecoxib for postoperative pain. Cochrane Database Syst Rev. 2003;(2):CD004233 (Year: 2003).*
Morissette, High-throughput crystallization: polymorphs, salts, co-crystals, and solvates of pharmaceutical solids, Advanced Drug Delivery Reviews, 2004, 56, pp. 275-300 (Year: 2004).*
International Search Report and Written Opinion, dated Oct. 1, 2024, for International Application No. PCT/US24/30982. (30 pages).

* cited by examiner

*Primary Examiner* — Renee Claytor
*Assistant Examiner* — Andrew P Lee
(74) *Attorney, Agent, or Firm* — Seed Intellectual Property Law Group LLP

(57) ABSTRACT

Disclosed herein are solid forms containing a compound of formula (I):

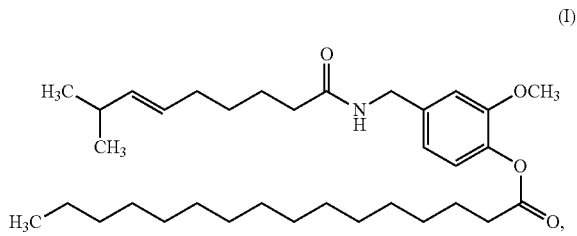

a solvate, hydrate or isotope thereof, wherein the solid form is characterized by an X-ray powder diffraction pattern having at least one peak position, in degrees 2θ (±0.2°), selected from 5.48, 13.74, 19.22 and 20.06. Also disclosed herein are related pharmaceutical compositions and methods of treatment.

30 Claims, 14 Drawing Sheets

STABLE FORMS OF CAPSAICIN PALMITATE FOR THE TREATMENT OF PAIN

BACKGROUND

Technical Field

The present disclosure relates to pharmaceutical compositions, including a solid form of capsaicin palmitate and formulations thereof that are useful for treatment of pain. The compositions disclosed herein include well-tolerated, non-burning capsaicin-based analgesics for the treatment of mild to moderate pain that exhibit few discernable side-effects. A palmitoylated formulation of capsaicin yields a unique solid form that has analgesic efficacy but with diminished thermal sensitivity compared to capsaicin palmitate synthesized using previously documented methods.

Description of the Related Art

Pain management therapies are limited. Chronic pain is a debilitating condition that, according to the National Institutes of Health (NIH), affects an estimated 50 million adults in the United States, or roughly 20% of the adult population. While over-the-counter (OTC) pain medications can be useful for the treatment of mild to moderate pain, like all medications they have limitations and risks.

Pain medications, such as nonsteroidal anti-inflammatory drugs (NSAIDs) which are "black-boxed" as a drug category by the FDA, such as diclofenac that has potential for cardiovascular toxicity, illustrate the problem. NSAIDs can be effective for treating mild to moderate pain. However, they may not be effective for more severe or chronic pain conditions. Pain medications, particularly NSAIDs and acetaminophen, can have a wide range of side effects, including gastrointestinal problems (such as ulcers and bleeding), liver damage, and kidney damage that can be produced by frequent use. These risks can be increased when medications are taken in high doses or over long periods of time. Such medications can have interactions with other medications, can be dangerous if taken in excessive doses (leading to overdose and potentially life-threatening complications), and are limited in their range of treatment options, which may not be effective for all types of pain, such as neuropathic pain.

Topical analgesics can be used successfully to relieve mild to moderate pain in areas of the body, such as bruised, sprained or strained muscles or joints. However, pain management with topical analgesics is associated with various medical challenges that may include limited effectiveness and dermal tolerability relative to other routes of administration. For instance, topical analgesics can produce skin irritation, particularly if used for prolonged periods of time. Common adverse effects include erythema or contact dermatitis, burning or itching, photosensitivity, dryness, or skin discoloration. Topical analgesics may not be absorbed into the bloodstream as effectively as oral medications, which can limit their effectiveness for certain types of pain. Because topical creams and gels are generally perceived by patients as safe, this can create the potential for overdose. While topical analgesics are generally safe, they can be dangerous if applied in high doses, if used over extended lengths of time, or if they are ingested.

Therapeutic limitations for OTC topical drugs exist even with the high number and variety of options. Options for topicals include a spectrum recognized by physicians as moderately effective drugs but are generally available in a small range of concentrations. Monographed drugs such as capsaicin, NSAIDs, methyl salicylate, menthol, and camphor are examples. The limited dose ranges available in OTC topical drugs are due, in part, to the difficulty in achieving concentrations that are efficacious but devoid of adverse side effects.

Most topical analgesics are, therefore, poorly suited for the treatment of severe pain caused by neuropathies, post-surgical or traumatic pain, or chronic pain resulting from diseases such as arthritis or cancer. Complicating the general inadequacy of pain relief by the restricted concentrations of topical medications are the attendant issues of adverse skin characteristics. To avoid drug side effects, topical therapies are generally restricted to the treatment of mild to moderate pain, such as pain found in the beginning stages of arthritis or from strains and sprains. See Robert L Barkin, "The pharmacology of topical analgesics", *Postgrad Med.* 2013, 125(4 Suppl 1):7-18 PMID: 24547599 doi: 10.1080/00325481.2013.1110566911. Frias B, Merighi A. Capsaicin, Nociception and Pain. Molecules. 2016 Jun. 18; 21(6):797. PMID: 27322240 doi: 10.3390/molecules21060797. Basbaum, A. I., Bautista, D. M., Scherrer, G., & Julius, D. "Cellular and molecular mechanisms of pain", *Cell,* 2009, 139(2), 267-284 PMID: 19837031 doi: 10.1016/j.cell.2009.09.028.

The objective of the present disclosure was to address these issues through discovery of unique solid forms of a known capsaicin derivative, capsaicin palmitate (also referred to herein as "CP"). Capsaicin was chosen as a research molecule for its analgesic properties. Esterification with palmitic acid was used to enhance bioavailability by increasing the lipophilicity of capsaicin. Use of capsaicin is not ideal because of low epidermal absorbability, and because its topical analgesic potential is concentration-limited due to its tendency to produce thermal irritation of the skin. It is well documented that such thermal irritation to the skin can reduce patient adherence and, thereby, limit therapeutic applicability. In general, the focus of using palmitation in topical products, such as lotions and creams, has been to increase absorption. Palmitoylation is also advantageous due to its ability to resist enzymatic degradation of the ester bonds-thereby increasing the half-life of palmitate derivatives in both tissues and in the bloodstream.

Natural capsaicin (trans-8-methyl-N-vanillyl-6-nonenamide, $C_{18}H_{27}NO_3$) is a capsicum amide consisting of congeners differing at the hydrophobic chain terminus (Wei Zhang et al., Pharmacological activity of capsaicin: Mechanisms and controversies (Review). Mol Med Rep. 2024 March; 29(3): 38. https://doi.org/10.3892/mmr.2024.13162). The more prominent congeners by way of proportion relative to capsaicin, include dihydrocapsaicin (30-40%), nordihydrocapsaicin (<10%), dihydrohomocapsaicin and homocapsaicin (<5% combined). A phenolic hydroxyl group is present at the para position of the phenylene group (relative to aminoalkyl group) in each of these congeners, and is a nucleophile for the formation of esters, such as that made with palmitic acid. Therefore, by way of reference to capsaicin and its capsaicin palmitate ester in the present disclosure, it is assumed that the naturally occurring family of dihydrocapsaicin, nordihydrocapsaicin, dihydrohomocapsaicin, homocapsaicin, as well as dihydrocapsaicin palmitate, nordihydrocapsaicin palmitate dihydrohomocapsaicin palmitate and homocapsaicin palmitate is included in total.

PCT/US2024/030982, the entire contents of which are incorporated herein by reference, discloses a solid form of CP that was discovered in a controlled clinical thermal sensitivity study designed to identify non-irritating, non-burning forms of CP. As a comparative form of CP (referred to herein as "Form T"), a known CP was also prepared using a method disclosed in U.S. Pat. No. 7,493,666, the entire contents of which are incorporated herein by reference. The methodology put forward in the '666 Patent describes how to synthesize one form of CP, but where the addition of an ester of myristoleic acid to CP (Claim 1 of U.S. Pat. No. 7,943,666) was claimed as an additional therapeutic component, not required in the present disclosure of a unique form of CP. The presently disclosed crystalline form of CP (referred to herein as "Form C" or "CP Form C") was discovered during discrete variable temperature melts that were based on unique endothermic characteristics found with Differential Scanning Calorimetry (DSC).

BRIEF SUMMARY

In one aspect, the present disclosure provides a solid form (referred to herein as the "Form C" or "CP Form C"), comprising a compound of formula (I):

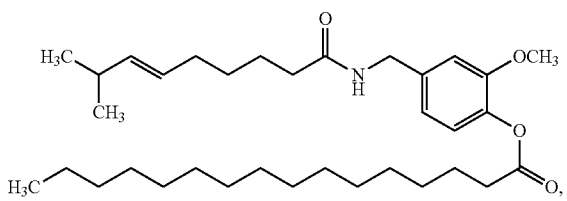

or a solvate, hydrate or isotope thereof, wherein the solid form is characterized by an X-ray diffraction pattern comprising at least one peak position, in degrees 2θ (±0.2°), selected from the group consisting of 5.48, 13.74, 19.22 and 20.06.

In another aspect, the present disclosure provides a pharmaceutical composition comprising a solid form of the present disclosure and at least one selected from the group consisting of an antioxidant, an emollient, an emulsifier, a moisturizer, a preservative and a surfactant.

In another aspect, the present disclosure provides methods of treating a disease, comprising administration to a subject in need thereof an effective amount of a solid form of the present disclosure, or by administering to the subject an effective amount of a pharmaceutical composition of the present disclosure.

In another aspect, a treatment method of the present disclosure further comprises administration to the subject an additional therapeutic agent, a secondary therapy, or a combination thereof.

DETAILED DESCRIPTION

Figure 1:
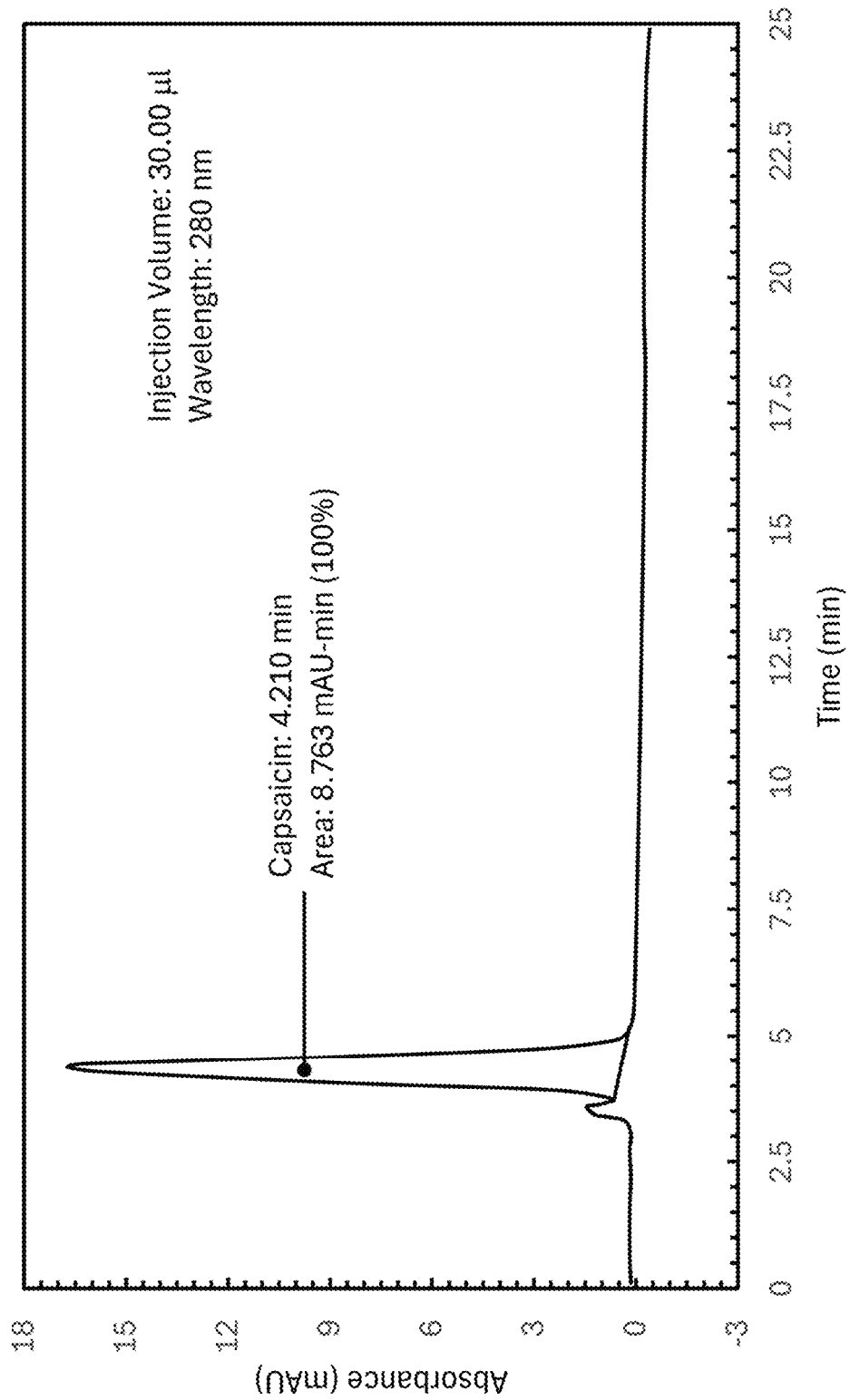
FIG. 1 is an HPLC chromatogram of a sample of natural capsaicin.

The present disclosure relates to pharmaceutical compositions including a solid form of capsaicin palmitate (CP) and formulations thereof that are useful for treatment of pain. As illustrated in Examples 1-6 below, the present Inventors discovered a new solid form of CP (referred to herein as "Form C" or "CP Form C") that is distinguished from other forms of CP described below.

Terms and Definitions

Prior to setting forth this disclosure in more detail, it may be helpful to an understanding thereof to provide definitions of certain terms to be used herein. Additional definitions are set forth throughout this disclosure.

As used herein, the terms "a," "an," "the" and similar terms used in the context of the present invention (especially in the context of the claims) are to be construed to cover both the singular and plural unless otherwise indicated herein or clearly contradicted by the context. The use of any and all examples, or exemplary language (e.g. "such as") provided herein is intended merely to better illuminate the invention and does not pose a limitation on the scope of the invention otherwise claimed. The use of the alternative (e.g., "or") should be understood to mean either one, both, or any combination thereof of the alternatives.

In the present description, any concentration range, percentage range, ratio range, or integer range is to be understood to include the value of any integer within the recited range and, when appropriate, fractions thereof (such as one tenth and one hundredth of an integer), unless otherwise indicated. Also, any number range recited herein relating to any physical feature is to be understood to include any integer within the recited range, unless otherwise indicated. When a specified amount or value is used, it should be understood to encompass slight deviation from the specified amount or value, which one skilled in the art would understand as equivalent to or substantially the same as the specified amount or value. In some embodiments, a specified amount or value encompass ±10% of the specified amount or value. In some embodiments, a specified amount or value encompass ±5% of the specified amount or value.

As used herein, ranges and amounts may be expressed as "about" a particular value or range. About also includes the exact amount. Hence, for example, a pH value of "about 7"

means a pH of about 7, and also means a pH of 7. In some embodiments, "about" means within 5% of the value. Hence, a pH of "about 7" means a pH ranging from 6.65 to 7.35. In other embodiments, "about" means within 4% of the value. In other embodiments, "about" means within 3% of the value. In other embodiments, "about" means within 2% of the value. In other embodiments, "about" means within 1% of the value. Generally, the term "about" includes an amount that would be expected to be within experimental error.

As used herein, the phrase "same or substantially the same" has the same meaning as the term "about" as defined above.

The terms "administer", "administering", "administration", and the like, as used herein, refer to methods that may be used to enable delivery of compounds or compositions to the desired site of action. Administering a compound or composition described herein to a subject may include administering the compound or composition topically, orally, parenterally, transdermally, transmucosally, subcutaneously or intradermally to the subject. Administration techniques that can be employed with the agents and methods described herein are found in e.g., Goodman and Gilman, The Pharmacological Basis of Therapeutics, current ed.; Pergamon; and Remington's, Pharmaceutical Sciences (current edition), Mack Publishing Co., Easton, Pa.

As used herein the term "co-administer" refers to the presence of two active agents being administered to a subject. Active agents that are co-administered can be concurrently or sequentially delivered.

As used herein, the term "treat", "treating" or "treatment" of any disease, condition or disorder, refers to the management and care of a patient for the purpose of combating the disease, condition, or disorder and includes the administration of a compound of the present invention to obtaining desired pharmacological and/or physiological effect. The effect can be therapeutic, which includes achieving, partially or substantially, one or more of the following results: partially or totally reducing the extent of the disease, condition or disorder; ameliorating or improving a clinical symptom, complications or indicator associated with the disease, condition or disorder; or delaying, inhibiting or decreasing the likelihood of the progression of the disease, condition or disorder; or eliminating the disease, condition or disorder. In certain embodiments, the effect can be to prevent the onset of the symptoms or complications of the disease, condition or disorder.

The term "combination therapy" or "in combination with" or "pharmaceutical combination" refers to the administration of two or more therapeutic agents to treat a therapeutic condition or disorder described in the present disclosure. Such administration encompasses co-administration of these therapeutic agents in a substantially simultaneous manner, such as in a single application having a fixed ratio of active ingredients. Alternatively, such administration encompasses co-administration in multiple, or in separate applications for each active ingredient. In addition, such administration also encompasses use of each type of therapeutic agent being administered prior to, concurrent with, or sequentially to each other with no specific time limits. In each case, the treatment regimen will provide beneficial effects of the drug combination in treating the conditions or disorders described herein.

The term "effective amount" means an amount when administered to the subject which results in beneficial or desired results, including clinical results, e.g., inhibits, suppresses or reduces the symptoms of the condition being treated in the subject as compared to a control. For example, a therapeutically effective amount of a single drug for moderate to severe pain can be given over broad unit dosage forms. For example, oxycodone can be prescribed in doses ranging from 5 to 15 mg every 4 to 6 hours as needed, to 160 mg continual release, depending on the patient. Tramadol can be prescribed in doses of 50 mg to 100 mg every 4 to 6 hours, with a maximum of 400 mg per day. Capsaicin can be obtained as an OTC formulations from 0.025% to 0.25% of carrier cream and at 8% in a prescription patch.

Suitable dosages are known for approved therapeutic agents and can be adjusted by the skilled artisan according to the condition of the subject, the type of condition(s) being treated and the amount of a compound of the invention being used by following, for example, dosages reported in the literature and recommended in the Physician's Desk Reference ($71^{st}$ ed., 2017).

As used herein, a subject is "in need of" a treatment if such subject would benefit biologically, medically or in quality of life from such treatment (preferably, a human).

As used herein, a "patient," "subject" or "individual" are used interchangeably and refer to either a human or non-human animal. The term includes mammals such as humans. Typically, the animal is a mammal. A subject also refers to for example, primates (e.g., humans, male or female), cows, sheep, goats, horses, dogs, cats, rabbits, rats, mice, fish, birds and the like. In certain embodiments, the subject is a primate. Preferably, the subject is a human.

Unless specified otherwise, the term "compounds of the present disclosure" refers to compounds of formula (I), as well as isotopically labeled compounds (including deuterium substitutions), and inherently formed moieties (e.g., polymorphs, solvates and/or hydrates).

Furthermore, the compounds of the present disclosure may also be obtained in the form of their hydrates, or include other solvents used for their preparation. The compounds of the present disclosure may inherently or by design form solvates with pharmaceutically acceptable solvents (including water); therefore, it is intended that the disclosure embrace both solvated and unsolvated forms. The term "solvate" refers to a molecular complex of a compound of the present invention (including pharmaceutically acceptable salts thereof) with one or more solvent molecules. Such solvent molecules are those commonly used in the pharmaceutical art, which are known to be innocuous to the recipient, e.g., water, ethanol, and the like. The term "hydrate" refers to the complex where the solvent molecule is water.

The compounds of the present disclosure, including salts, hydrates and solvates thereof, may inherently or by design form polymorphs.

As used herein, "amorphous" refers to a non-crystalline state of a compound which may be solid or solubilized. For example, "amorphous" refers to a compound without a regularly repeating arrangement of molecules or external face planes.

Solid Forms of Capsaicin Palmitate

The present disclosure discloses solid forms of capsaicin palmitate.

One embodiment relates to a solid form (referred to herein as the "Form C" or the "CP Form C") comprising a compound of formula (I):

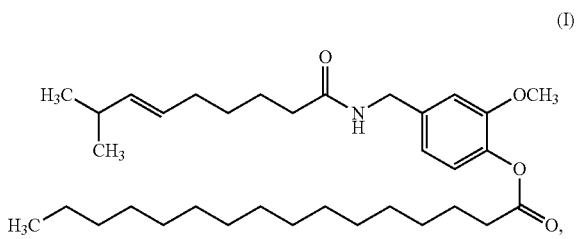 [SMILES: CCCCCCCCCCCCCCCC(=O)Oc1ccc(CNC(=O)CCCC/C=C/C(C)C)cc1OC]

(I)

or a solvate, hydrate or isotope thereof, wherein the solid form is characterized by an X-ray diffraction pattern as described in the experimental section below, comprising at least one peak position, in degrees 2θ (±0.2°), selected from the group consisting of 5.48, 13.74, 19.22 and 20.06.

In another embodiment, the X-ray diffraction pattern of the Form C comprises at least two peak positions, in degrees 2θ (±0.2°), selected from the group consisting of 5.48, 13.74, 19.22 and 20.06. In another embodiments, the X-ray diffraction pattern of the Form C comprises at least three peak positions, in degrees 2θ (±0.2°), selected from the group consisting of 5.48, 13.74, 19.22 and 20.06.

In another embodiment, the X-ray diffraction pattern of the Form C comprises peak positions, in degrees 2θ (0.2°), selected from the group consisting of 5.48, 13.74, 19.22 and 20.06.

In another embodiments, the X-ray diffraction pattern of the Form C comprises peak positions, in degrees 2θ (±0.2°), of 5.48, 13.74, 19.22 and 20.06, and at least one peak position selected from the group consisting of 8.24, 14.65, 15.80 and 18.30. In another embodiment, the X-ray diffraction pattern of the Form C comprises peak positions, in degrees 2θ (±0.2°), of 5.48, 13.74, 19.22 and 20.06, and at least two peak positions selected from the group consisting of 8.24, 14.65, 15.80 and 18.30.

In another embodiment, the X-ray diffraction pattern of the Form C comprises peak positions, in degrees 2θ (0.2°), selected from the group consisting of 5.48, 8.24, 13.74, 14.65, 18.30, 19.22 and 20.06.

In some embodiments, the Form C further comprises a compound of formula (II):

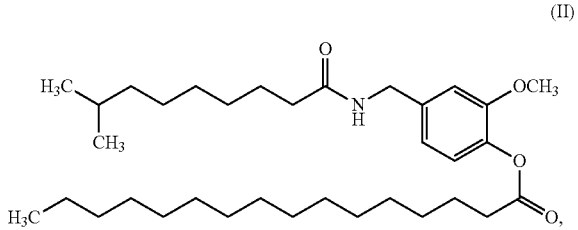 [SMILES: CCCCCCCCCCCCCCCC(=O)Oc1ccc(CNC(=O)CCCCCCC(C)C)cc1OC]

(II)

a solvate, hydrate or isotope thereof.

Pharmaceutical Compositions

The present disclosure also includes pharmaceutical compositions comprising the CP Form C described herein.

One embodiment relates to a pharmaceutical composition, comprising the CP Form C (as described in any of the embodiments disclosed herein) and at least one selected from the group consisting of an antioxidant, an emollient, an emulsifier, a moisturizer, a preservative and a surfactant.

In some embodiments, the pharmaceutical composition comprises the CP Form C (as described in any of the embodiments disclosed herein) and at least one antioxidant. Non-limiting examples of antioxidants that can be contained within compositions of the present disclosure include, for example, acetyl cysteine, ascorbic acid, ascorbic acid polypeptide, ascorbyl dipalmitate, ascorbyl methylsilanol pectinate, ascorbyl palmitate, ascorbyl stearate, BHA, BHT, t-butyl hydroquinone, cysteine, cysteine HCl, diamylhydroquinone, di-t-butylhydroquinone, dicetyl thiodipropionate, dioleyl tocopheryl methylsilanol, disodium ascorbyl sulfate, distearyl thiodipropionate, ditridecyl thiodipropionate, dodecyl gallate, erythorbic acid, esters of ascorbic acid, ethyl ferulate, ferulic acid, gallic acid esters, hydroquinone, isooctyl thioglycolate, kojic acid, magnesium ascorbate, magnesium ascorbyl phosphate, methylsilanol ascorbate, natural botanical anti-oxidants such as green tea or grape seed extracts, nordihydroguaiaretic acid, octyl gallate, phenylthioglycolic acid, potassium ascorbyl tocopheryl phosphate, potassium sulfite, propyl gallate, quinones, rosmarinic acid, sodium ascorbate, sodium bisulfite, sodium erythorbate, sodium metabisulfite, sodium sulfite, superoxide dismutase, sodium thioglycolate, sorbityl furfural, thiodiglycol, thiodiglycolamide, thiodiglycolic acid, thioglycolic acid, thiolactic acid, thiosalicylic acid, tocophereth-5, tocophereth-10, tocophereth-12, tocophereth-18, tocophereth-50, tocopherol, tocophersolan, tocopheryl acetate, tocopheryl linoleate, tocopheryl nicotinate, tocopheryl succinate, tris(nonylphenyl)phosphite, and the like, and combinations thereof.

In some embodiments, the pharmaceutical composition comprises the CP Form C (as described in any of the embodiments disclosed herein) and at least one emollient. Non-limiting examples of emollients that can be contained within compositions of the present disclosure include, for example, actiphyte of aloe vera, aloe extract, Cetiol® MM, Cetiol® OE, cetyl alcohol, Hetester SSS, Jeechem® MM, Lexol® IPL, octyl palmitate, octyl palmitateneopentyl glycol heptanoate, Performalene 400, neopentyl glycol heptanoate, neopentyl glycol diheptanoate, octyldodecyl neopentanoate, Trivent NP-13, CJ2, and the like, and combinations thereof.

In some embodiments, the pharmaceutical composition comprises the CP Form C (as described in any of the embodiments disclosed herein) and at least one emulsifier. Non-limiting examples of emulsifiers that can be contained within compositions of the present disclosure include, for example, acrylates/C 10-30 alkyl acrylate crosspolymer, alkyl modified dimethiconecopolyols, alkylphenol-hydroxypolyoxyethylene, benzyl alcohol, benzyl benzoate, beeswax/borax, benzalkonium chloride, 1,3-butyleneglycol, carbomer, castor oil, cetyl alcohol, Ceteareth-20, cholesterol, cholesterol esters, corn germ oil, cottonseed oil, distearyldimethylammonium chloride, dimethylformamide, dicaprylate/dicaparate, Disteareth-75 IPDI, ethoxylated di-fatty esters, ethyl alcohol, ethyl carbonate, ethyl acetate, fatty acid esters of sorbitan, glycerol, glycerol di-stearate, glyceryl monostearate, groundnut oil, ionic polysorbate surfactant, isopropyl alcohol, nonylphenol polyethylene glycol ethers, nonoxynol-9, octoxynol-40, olive oil, PEG (polyethyleneglycol)-100 stearate, PEG-150 distearate, PEG-150 Pentaerythrityl Tetrastearate, polysorbate 20, phosphatidylcholine, polysorbate, poloxamer 188, poloxamer 407, polyacrylamide, polyquaternium-37, polyethylene glycol 400, polyethylene glycol 8000, Poly(oxy-1,2-ethanediyl), polyoxyl 35 castor oil, polyoxyl 40 hydrogenated castor oil, polyoxyl 15 hydroxystearate, polyoxyl 40 stearate, polysorbate 20, polysorbate 80, propylene glycol, polyglyceryl esters, PPG-1 Trideceth-6, polyethylene glycols, sesame oil, sodium lauryl sulfate, sodium docusate, sodium dodecyl sulfate, sodium lauryl stearate, sodium cetearyl sulfate, steareth 2, steareth 20, steapyrium chloride, taurocholic acid, tetrahydrofurfuryl alcohol, tyloxapol, and the like, and combinations thereof.

In some embodiments, the pharmaceutical composition comprises the CP Form C (as described in any of the embodiments disclosed herein) and at least one moisturizer. Non-limiting examples of moisturizers that can be contained within compositions of the present disclosure include, for example, acetylated lanolin, acetylated lanolin alcohol, acrylate copolymers, alanine, algae extract, aloe barbadensis, aloe-barbadensis extract, aloe barbadensis gel, althea officinalis extract, aluminum starch octenylsuccinate, aluminum stearate, apricot (*Prunus armeniaca*) kernel oil, arginine, arginine aspartate, *Arnica montana* extract, ascorbic acid, ascorbyl palmitate, aspartic acid, avocado (*Persea gratissima*) oil, barium sulfate, barrier sphingolipids, butyl alcohol, beeswax, behenyl alcohol, beta-sitosterol, BHT, birch (*Betula alba*) bark extract, borage (*Borago officinalis*) extract, 2-bromo-2-nitropropane-1,3-diol, butcherbroom (*Ruscus aculeatus*) extract, butylene glycol, *Butyrospermum parkii*, *Calendula officinalis* extract, *Calendula officinalis* oil, candelilla (*Euphorbia cerifera*) wax, canola oil, caprylic/capric triglyceride, cardamon (*Elettaria cardamomum*) oil, carnauba (*Copernicia cerifera*) wax, carrageenan (*Chondrus crispus*), carrot (*Daucus carota sativa*) oil, castor (*Ricinus communis*) oil, ceramides, ceresin, ceteareth-5, ceteareth-12, ceteareth-20, cetearyl octanoate, ceteth-20, ceteth-24, cetyl acetate, cetyl octanoate, cetyl palmitate, chamomile (*Anthemis nobilis*) oil, cholesterol, cholesterol esters, cholesteryl hydroxystearate, citric acid, clary (*Salvia sclarea*) oil, cocoa (*Theobroma cacao*) butter, coco-caprylate/caprate, coconut (*Cocos nucifera*) oil, collagen, collagen amino acids, corn (*Zea mays*) oil, fatty acids, decyl oleate, dextrin, diazolidinyl urea, dimethicone copolyol, dimethiconol, dioctyl adipate, dioctyl succinate, dipentaerythrity I hexacapry late/hexacaprate, DMD M hydantoin, DNA, erythritol, ethoxydiglycol, ethyl linoleate, *Eucalyptus globulus* oil, evening primrose (*Oenothera biennis*) oil, fatty acids, tructose, gelatin, *Geranium maculatum* oil, glucosamine, glucose glutamate, glutamic acid, glycereth-26, glycerin (e.g., vegetable glycerin), glycerol, glyceryl distearate, glyceryl hydroxystearate, glyceryl laurate, glyceryl linoleate, glyceryl myristate, 40 glyceryl oleate, glyceryl stearate, glyceryl stearate SE, glycine, glycol stearate, glycol stearate SE, glycosaminoglycans, grape (*Vitis vinifera*) seed oil, hazel (*Corylus americana*) nut oil, hazel (*Corylus avellana*) nut oil, hexylene glycol, honey, hyaluronic acid, hybrid safflower (*Carthamus tinctorius*) oil, hydrogenated castor oil, hydrogenated coco-glycerides, hydrogenated coconut oil, hydrogenated lanolin, hydrogenated lecithin, hydrogenated palm glyceride, hydrogenated palm kernel oil, hydrogenated soybean oil, hydrogenated tallow glyceride, hydrogenated vegetable oil, hydrolyzed collagen, hydrolyzed elastin, hydrolyzed glycosaminoglycans, hydrolyzed keratin, hydrolyzed soy protein, hydroxylated lanolin, hydroxyproline, imidazolidinyl urea, iodopropynyl butylcarbamate, isocetyl stearate, isocetyl steamyl stearate, isodecyl oleate, isopropyl isostearate, isopropyl lanolate, isopropyl myristate, isopropyl palmitate, isopropyl stearate, isostearamide DEA, isostearic acid, isostearyl lactate, isostearyl neopentanoate, jasmine (*Jasminum officinale*) oil, jojoba (*Buxus chinensis*) oil, kelp, kukui (*Aleurites moluccana*) nut oil, lactamide MEA, laneth-16, laneth-10 acetate, lanolin, lanolin acid, lanolin alcohol, lanolin oil, lanolin wax, lavender (*Lavandula angustifolia*) oil, lecithin, lemon (*Citrus medica limonum*) oil, linoleic acid, linolenic acid, *Macadamia ternifolia* nut oil, magnesium stearate, magnesium sulfate, maltitol, *Matricaria (Chamomilla recutita)* oil, methyl glucose sesquistearate, methylsilanol PCA, microcrystalline wax, mineral oil, mink oil, *Mortierella* oil, myristyl lactate, myristyl myristate, myristyl propionate, neopentyl glycol dicapry late/dicaprate, octyldodecanol, octyldodecyl myristate, octyldodecyl stearoyl stearate, octyl hydroxystearate, octyl palmitate, octyl salicylate, octyl stearate, oleic acid, olive (*Olea europaea*) oil, orange (*Citrus aurantium dulcis*) oil, palm (*Elaeis guineensis*) oil, palmitic acid, pantethine, panthenol, panthenyl ethyl ether, paraffin, PCA, peach (*Prunus persica*) kernel oil, peanut (*Arachis hypogaea*) oil, PEG-8 C12-18 ester, PEG-15 cocamine, PEG-150 distearate, PEG-5 thiolactic acid, thiosalicylic acid, tocophereth-5, tocophereth-10, tocophereth-12, tocophereth-18, tocophereth-50, tocopherol, tocophersolan, tocopheryl acetate, tocopheryl linoleate, tocopheryl nicotinate, tocopheryl succinate, and glyceryl isostearate, PEG-5 glyceryl stearate, PEG-30 tris(nonylphenyl)phosphite, glyceryl stearate, PEG-7 hydrogenated castor oil, PEG-40 hydrogenated castor oil, PEG-60 hydrogenated castor oil, PEG-20 methyl glucose sesquistearate, PEG40 sorbitan peroleate, PEG-5 soy sterol, PEG-10 soy sterol, PEG-2 stearate, PEG-8 stearate, PEG-20 stearate, PEG-32 stearate, PEG40 stearate, PEG-50 stearate, PEG-100 stearate, PEG-150 stearate, pentadecalactone, peppermint (*Mentha piperita*) oil, petrolatum, phospholipids, polyamino sugar condensate, polyglyceryl diisostearate, polyquaternium-24, polysorbate 20, polysorbate 40, polysorbate 60, polysorbate 80, polysorbate 85, potassium myristate, potassium palmitate, potassium sorbate, potassium stearate, propylene glycol, propylene glycol dicaprylate/dicaprate, propylene glycol dioctanoate, propylene glycol dipelargonate, propylene glycol laurate, propylene glycol stearate, propylene glycol stearate SE, PVP, pyridoxine dipalmitate, quaternium-15, quaternium-18 hectorite, quaternium-22, retinal, retinyl palmitate, rice (*Oryza sativa*) bran oil, rosemary (*Rosmarinus officinalis*) oil, rose oil, safflower (*Carthamus tinctorius*) oil, sage (*Salvia officinalis*) oil, salicylic acid, sandalwood (*Santalum album*) oil, serine, serum protein, sesame (*Sesamum indicum*) oil, shea butter (*Butyrospermum parkii*), silk powder, sodium chondroitin sulfate, sodium DNA, sodium hyaluronate, sodium lactate, sodium palmitate, sodium PCA, sodium polyglutamate, sodium stearate, soluble collagen, sorbic acid, sorbitan laurate, sorbitan oleate, sorbitan palmitate, sorbitan sesquioleate, sorbitan stearate, sorbitol, soybean (*Glycine soja*) oil, sphingolipids, squalane, squalene, stearamide MEA-stearate, stearic acid, stearoxy dimethicone, stearoxytrimethylsilane, stearyl alcohol, stearyl glycyrrhetinate, stearyl heptanoate, stearyl stearate, sunflower (*Helianthus annuus*) seed oil, sweet almond (*Prunus amygdalus dulcis*) oil, synthetic beeswax, tocopherol, tocopheryl acetate, tocopheryl linoleate, tribehenin, tridecyl neopentanoate, tridecyl stearate, triethanolamine, tristearin, urea, vegetable oil, water, waxes, wheat (*Triticum vulgare*) germ oil, ylang ylang (*Cananga adorata*) oil, and the like, and combinations thereof.

In some embodiments, the pharmaceutical composition comprises the CP Form C (as described in any of the embodiments disclosed herein) and at least one preservative. Non-limiting examples of preservatives that can be contained within compositions of the present disclosure include, for example, ascorbyl palmitate, benzalkonium chloride, benzethonium chloride, benzyl alcohol, Bronopol, butylated hydroxyanisole (BHA), butylated hydroxytoluene (BHT), caprylyl glycol, cetrimide, chlorhexidine, chlorphenesin, dehydroacetic acid, DMDM Hydantoin, ethylhexylglycerin, Euxyl K500, Euxyl K940, Euxyl PE 9010, Germaben II, Germall Plus, glyceryl caprylate, imidazolidinyl urea, kojic acid, methylchloroisothiazolinone, methylisothiazolinone, methyl-, ethyl-, propyl-, and butyl-paraben, Optiphen DP, Optiphen DLP, Paragon II, Paragon III, Paragon MEPB, Paragon PPM, pentylene glycol, 2-phenoxyethanol, potassium sorbate, propyl gallate, sodium benzoate, sodium metabisulfite, α-tocopherol, tocopheryl acetate, and the like, and combinations thereof.

In some embodiments, the pharmaceutical composition comprises the CP Form C (as described in any of the embodiments disclosed herein) and at least one surfactant. Non-limiting examples of surfactants that can be contained within compositions of the present disclosure include, for example, cetearyl alcohol, ceteareth-20, glyceryl stearate, a polyoxyethylene (20) sorbitan monooleate ("polysorbate 20", commercial brand names such as Alkest TW 20, Scattics or Tween 20), a polyoxyethylene (80) sorbitan monooleate ("polysorbate 80", commercial brand names such as Alkest TW 80, Scattics or Tween 80), PEG-100 stearate, a PPG-30 cetyl ether such as Hetoxol C30P (Global Seven), a PPG-20 methyl glucose ether distearate such as Glucam P-20 Distearate Emollient (Noveon), PPG-20 methyl glucose ether acetate, PPG-20 sorbitan tristearate, PPG-20 methyl glucose ether distearate, PPG-20 distearate, PPG-15 stearyl ether such as Alamol-E (Croda-Unigema) and Procetyl 15 (Croda), PPG-15 stearyl ether benzoate, PPG-15 isohexadecyl ether, PPG-15 stearate, PPG-15 dicocoate, PPG-12 dilaurate, a PPG-11 stearyl ether such as Varonic APS (Evonik), a PPG-10 cetyl ether such as Procetyl 10 (Croda), PPG-10 glyceryl stearate, PPG-10 sorbitan monosterate, PPG-10 hydrogenated castor oil, PPG-10 cetyl phosphate, PPG-10 tallow amine, PPG-10 oleamide, PPG-10 cetyl ether phosphate, PPG-10 dinonylphenolate, PPG-9 laurate, PPG-8 dioctate, PPG-8 diethylhexylate, PPG-7 lauryl ether, PPG-5 lanolin wax ether, PPG-5 sucrose cocoate, PPG-5 lanolin wax, PPG-4 jojoba alcohol ether, PPG-4 lauryl ether, a PPG-3 myristyl ether such as Promyristyl PM-3 (Croda), a PPG-3 myristyl ether propionate such as Crodamol PMP (Croda), a PPG-3 benzyl ether myristate such as Crodamol STS (Croda), a PPG-3 hydrogenated castor oil such as Hetester HCP (Alzo), PPG-3-hydroxyethyl soyamide, PPG-2 Cocamide, PPG-2 lanolin alcohol ether, a PPG-1 coconut fatty acid isopropanolamide such as Amizett IPC (Kawaken Fine Chemicals), CETIOL® E (BASF), Jeechem® MM (Jeen), and the like, and combinations thereof.

In some embodiments, the pharmaceutical composition comprises the CP Form C (as described in any of the embodiments disclosed herein) and at least one selected from the group consisting of vegetable glycerin, sunflower oil, shea butter, Cetiol® MM (tetradecanoic acid, tetradecyl ester), Jeechem® MM (myristic acid, myristyl ester), cetyl alcohol, Ceteareth-20 (polyethylene glycol ether of cetearyl alcohol), glyceryl stearate, stearic acid, Euxyl® PE 9010 (phenoxyethanol/ethylhexylglycerin), Tween 80 (polysorbate 80, polyoxyethylene sorbitan monooleate) and coconut oil.

In some embodiments, the pharmaceutical composition comprises the CP Form C (as described in any of the embodiments disclosed herein), vegetable glycerin, sunflower oil, shea butter, Cetiol® MM (tetradecanoic acid, tetradecyl ester) or Jeechem® MM (myristic acid, myristyl ester), cetyl alcohol, Ceteareth-20 (polyethylene glycol ether of cetearyl alcohol), glyceryl stearate, stearic acid, Euxyl® PE 9010 (phenoxyethanol/ethylhexylglycerin), Tween 80 (polysorbate 80, polyoxyethylene sorbitan monooleate) and coconut oil.

In some embodiments, the pharmaceutical composition comprises the CP Form C (as described in any of the embodiments disclosed herein) with a content ranging from about 0.1 wt. % to about 10.0 wt. %, relative to a total weight of the pharmaceutical composition. In other embodiments, the content of the Form C in the pharmaceutical composition ranges from about 0.1 wt. % to about 0.5 wt. %, or from about 0.5 wt. % to about 1.0 wt. %, or from about 1.0 wt. % to about 1.5 wt. %, or from about 1.5 wt. % to about 2.0 wt. %, or from about 2.0 wt. % to about 2.5 wt. %, or from about 2.5 wt. % to about 3.0 wt. %, or from about 3.0 wt. % to about 3.5 wt. %, or from about 3.5 wt. % to about 4.0 wt. %, or from about 4.0 wt. % to about 4.5 wt. %, or from about 4.5 wt. % to about 5.0 wt. %, relative to the total weight of the pharmaceutical composition. In other embodiments, the content of the Form P in the pharmaceutical composition ranges from about 0.1 wt. % to about 0.2 wt. %, or from about 0.2 wt. % to about 0.3 wt. %, or from about 0.3 wt. % to about 0.4 wt. %, or from about 0.4 wt. % to about 0.5 wt. %, or from about 0.5 wt. % to about 0.6 wt. %, or from about 0.5 wt. % to about 0.6 wt. %, or from about 0.6 wt. % to about 0.7 wt. %, or from about 0.7 wt. %, or from about 0.7 wt. % to about 0.8 wt. %, or from about 0.8 wt. % to about 0.9 wt. %, or from about 0.9 wt. % to about 1.0 wt. %.

Treatment Methods

The present disclosure also includes methods of treating diseases using a CP Form C as described herein.

One embodiment relates to a method of treating a disease in a subject in need thereof by administering to the subject an effective amount of the CP Form C as described herein. Other embodiments relate to methods of treating a disease in a subject in need thereof by administering to the subject an effective amount of a pharmaceutical composition described herein.

Another embodiment relates to the use of the CP Form C as described herein in the manufacture of a medicament for treating a disease in a subject in need thereof. The present disclosure also provides for the use of the CP Form C for treating a disease in a subject in need thereof.

In the treatment methods and uses of the present disclosure the disease may be selected from painful conditions of post-herpetic neuralgia, diabetic neuropathy, diabetic foot pain due to neuropathy, metatarsalgia or gout, hallux rigidus, cannabis or cannabinoid hyperemesis syndrome, postmastectomy pain syndrome, oral neuropathic pain, trigeminal neuralgia, a temporomandibular joint disorder, hand and knee joint disorders including synovitis, meniscal tear, anterior and posterior cruciate ligament tear or dislocation, tendonitis, pain from hip and vertebrae disorders such as hernia, fibromyalgia, a cluster headache, a dermatological condition such as dermatitis, contact dermatitis, Stevens-Johnson Syndrome or pain and itch from other inflammatory foci due to a dermatological condition such as psoriasis, a cutaneous condition such as pruritus or specific forms of itch, erythema, tingling and the like, or combinations thereof. For example, in some embodiments the disease is selected from post-herpetic neuralgia, shingles, post-mastectomy pain syndrome, oral neuropathic pain, trigeminal neuralgia, a temporomandibular joint disorder, pruritus, uremic pruritus, a cluster headache, dental pain, osteoarthritis, rheumatoid arthritis, psoriatic arthritis, arthritis pain due to neck, hand, finger including stenosing tenosynovitis, knee, hip ankle and wrist dystrophia and function, including carpal tunnel. Painful conditions due to rhinopathy, oral mucositis, a cutaneous allergy, detrusor hyperreflexia, pain due to anti-cancer chemotherapy, lone pain/hematuria syndrome, neck pain, pain due to multiple sclerosis, amputation stump pain, reflex sympathetic dystrophy or complex regional pain syndrome (Type II; causalgia), allodynia, or idiopathic pain, pain due to skin tumor, and the like, or combinations thereof are included. Other conditions would include pain from post-surgical wounds or painful conditions due to traumatic injury including spinal cord and podiatric injury, fractures and dislocations.

In some embodiments, the route of administration of the CP Form C (or pharmaceutical composition described herein) is carried out by topical administration, which would include carrier vehicles such as creams, ointments, gel or patches, or by electrophoretic or oral administration.

The present disclosure also includes combination therapies. For example, in some embodiments the CP Form C (or pharmaceutical composition described herein) is co-administered with an additional therapeutic agent, a secondary therapy, or a combination thereof. Secondary therapies may include, for example, radiation therapy, surgical therapy, immunotherapy, gene therapy, infrared light, electrostimulation, and the like, or combinations thereof. Additional therapeutic agents may include, for example, a chemotherapeutical agent, a non-steroidal anti-inflammatory agent, steroidal agents, anesthetics, other analgesics, and the like, or combinations thereof.

While aspects of the present disclosure have been shown and described throughout this disclosure, it will be apparent to those skilled in the art that such aspects are provided by way of example only. Numerous variations, changes, and substitutions will now occur to those skilled in the art without departing from the disclosure. It should be understood that various alternatives to the aspects of the disclosure described throughout this disclosure may be employed in practicing the disclosure. It is intended that the following claims define the scope of the disclosure and that methods and structures within the scope of these claims and their equivalents be covered thereby.

EXAMPLES

Abbreviations

Cap: natural capsaicin;
CP: capsaicin palmitate
$CDCL_3$: deuterated chloroform;
DCM: dichloromethane;
DI: deionized;
DMAP: 4-dimethylaminopyridine;
EtOH: ethanol;
FTIR: Fourier-transform infrared spectroscopy;
HPLC: high-pressure liquid chromatography or high-performance liquid
chromatography;
MeCN: acetonitrile;
NMR: nuclear magnetic resonance spectroscopy;
ppm: parts per million;
XRD: X-ray diffraction;
PXRD: Powder X-ray diffraction;
RODI: reverse osmosis deionized;
TEA: triethylamine; and
TMS: tetramethylsilane.

HPLC Conditions

High-performance liquid chromatography (HPLC) was used to analyze the content and purity of natural capsaicin and the capsaicin palmitates prepared as described below. The HPLC conditions are summarized in Table 1 below.

TABLE 1

| HPLC method conditions | |
| --- | --- |
| Column | GL Sciences C18 |
|  | 4.6 × 250 mm (UP), 5 μm |
| Detection Wavelength | 280 nm |
| Column Temp. | 40 ± 2° C. |
| Flow Rate | 1.0 mL/min |
| Nominal Injection Volume | 50 μL (solid samples), |
|  | 30 μL (cream samples) |
| Typical. solution concn. | ~0.2 mg/mL |
| Sample diluent | acetonitrile |
| Sample Temperature | room temperature |
| Mobile Phase | 5/95 DI $H_2O$: Methanol + |
| (non-gradient) | 0.1% TFA in Water |

FIG. 1 shows an HPLC chromatogram for a 0.17 mg/mL solution of natural capsaicin (having a 64:36 molar ratio of capsaicin to dihydrocapsaicin) that was obtained using the HPLC conditions of Table 1. As illustrated in FIG. 1, natural capsaicin had a retention time of about 4.2 minutes using the HPLC conditions of Table 1.

Figure 2:
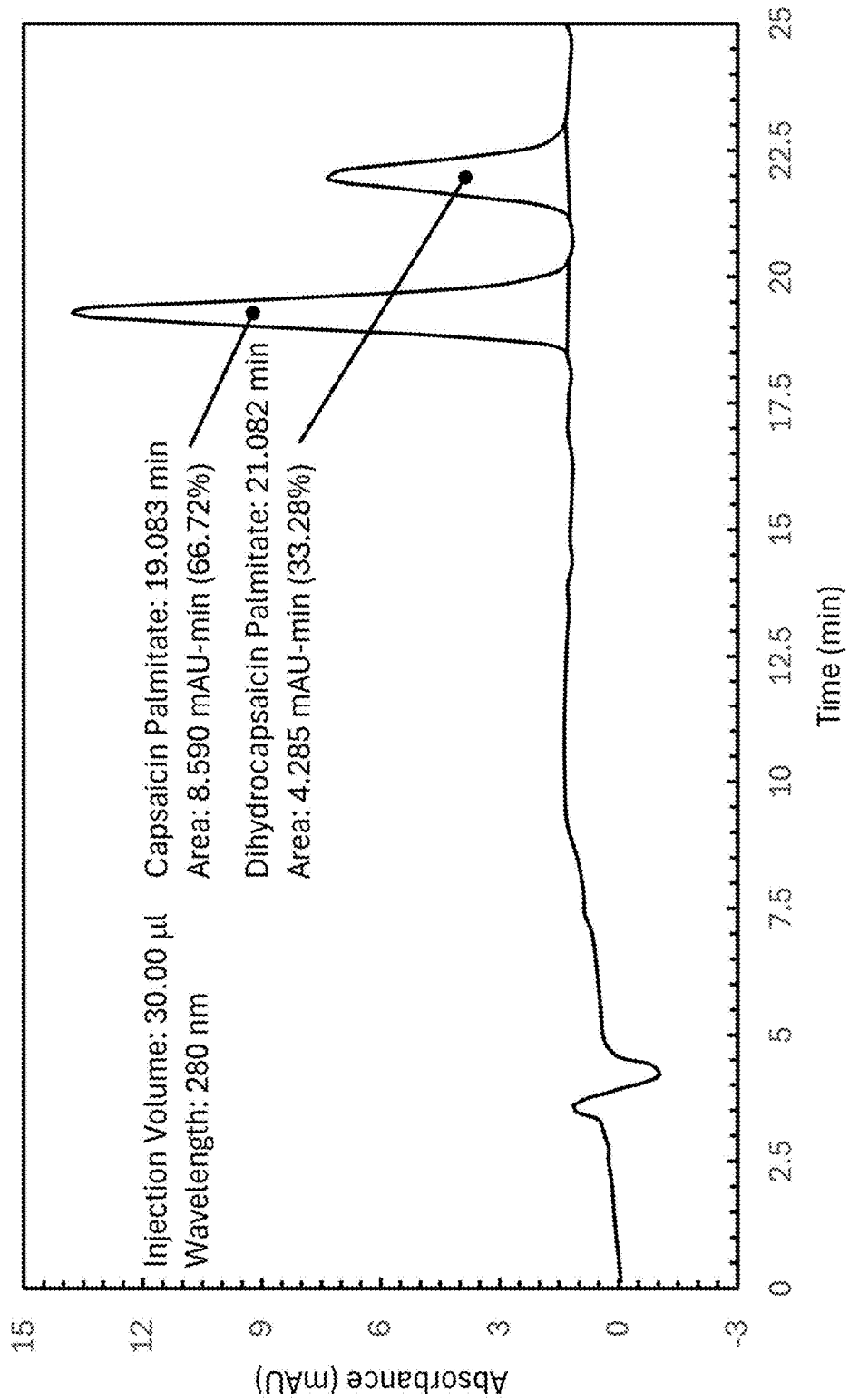
FIG. 2 is an HPLC chromatogram of a saturated solution (~0.28 mg/mL) of the capsaicin palmitate prepared in Example 1 (Form P)

FIG. 2 illustrates an HPLC chromatogram for a saturated solution (~0.28 mg/mL) of the capsaicin palmitate prepared in Example 1 described below (having a 64:36 molar ratio of capsaicin palmitate to dihydrocapsaicin palmitate), which was obtained using the HPLC conditions of Table 1. As illustrated in FIG. 2, capsaicin palmitate had a retention time of about 19.1 minutes and dihydrocapsaicin palmitate had a retention time of about 21.8 minutes under the HPLC conditions of Table 1.

NMR Conditions

Nuclear magnetic resonance (NMR) spectroscopy was used to analyze the content and purity of natural capsaicin and the capsaicin palmitates prepared as described below. The NMR conditions are summarized in Table 2 below.

TABLE 2

| NMR method condition | |
| --- | --- |
| Instrument | Bruker Avance |
| Field Strength | 500 MHz |
| Deuterated Solvent | $CDCl_3$ |
| Internal Standard | tetramethylsilane (TMS) |

Figure 3:
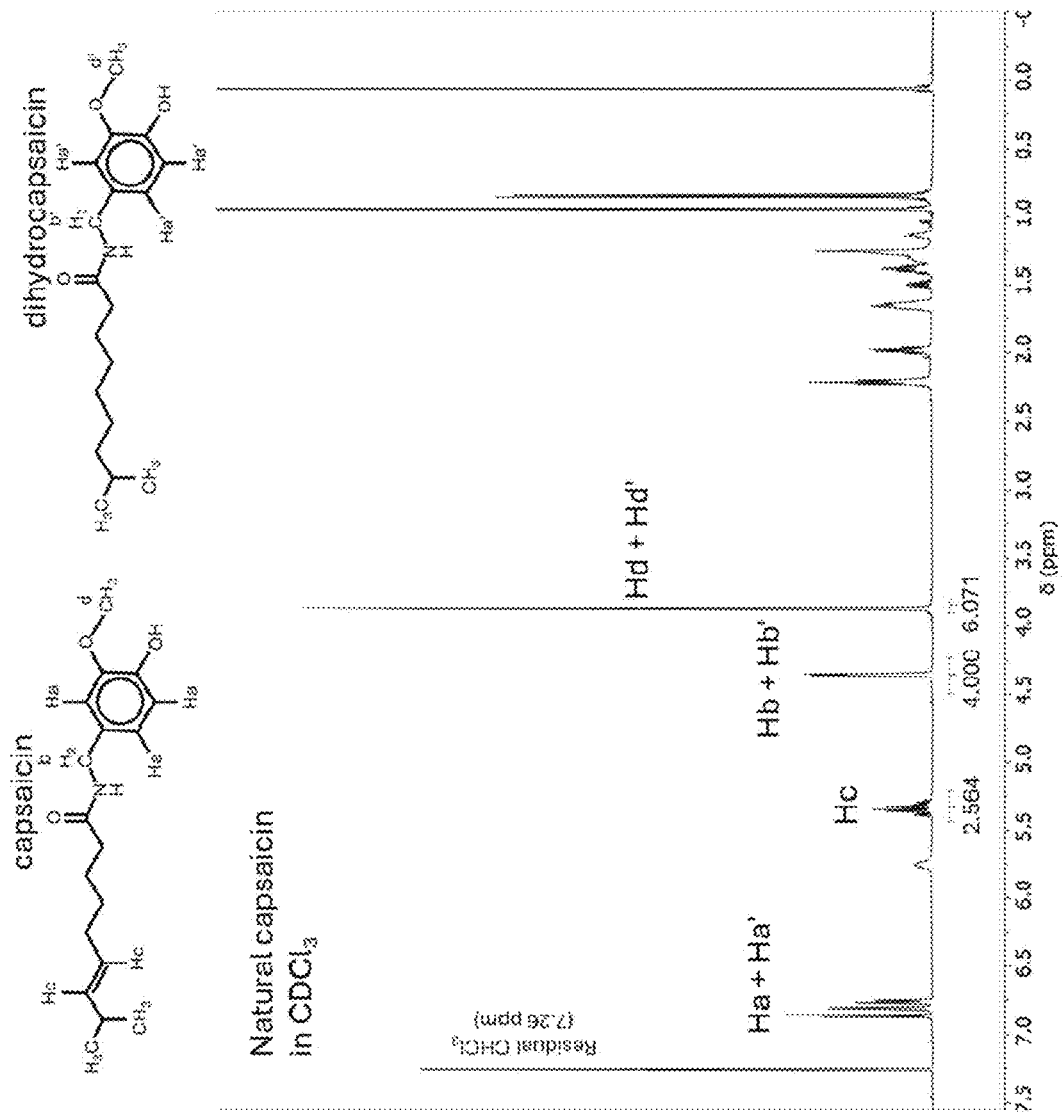
FIG. 3 is an NMR spectrum of a sample of natural capsaicin in deuterated chloroform.

FIG. 3 shows an NMR spectrum of a sample of natural capsaicin (having a ~64:36 molar ratio of capsaicin to dihydrocapsaicin), which was obtained using the NMR conditions of Table 2.

Figure 4:
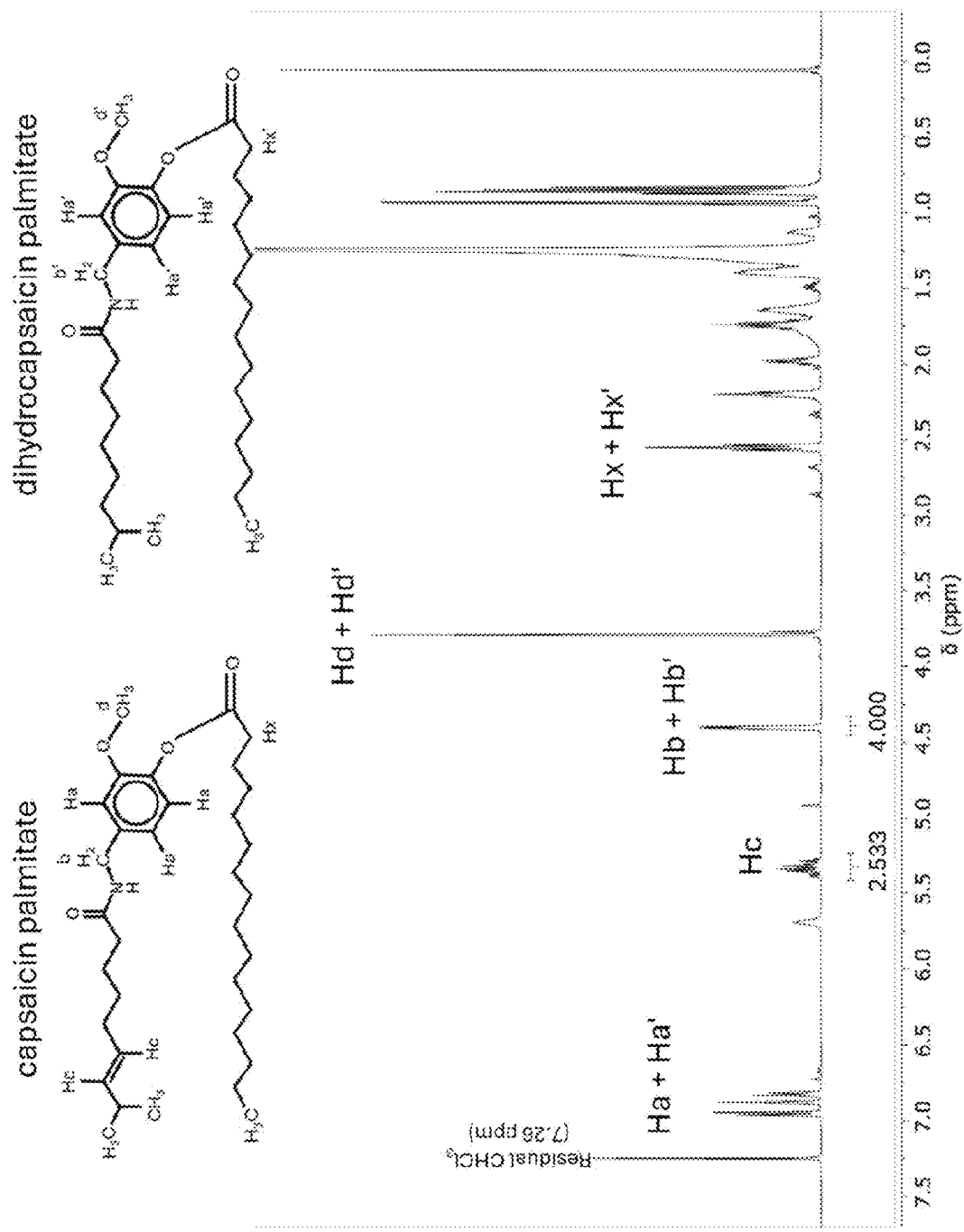
FIG. 4 is an NMR spectrum of the capsaicin palmitate prepared in Example 1 (Form P)

FIG. 4 shows an NMR spectrum of the capsaicin palmitate preparing in Example 1 described below (having a 64:36 molar ratio of capsaicin palmitate to dihydrocapsaicin palmitate), which was obtained using the NMR conditions of Table 2.

XRD Conditions

X-ray diffraction was used to analyze the capsaicin palmitate Forms P and T prepared as described below. The XRD conditions are summarized in Table 3 below.

TABLE 3

| XRD method conditions | |
| --- | --- |
| Instrument | Rigaku Oxford Diffraction Synergy-S |
|  | Diffractometer |

TABLE 3-continued

| XRD method conditions | |
|---|---|
| Detector | HyPix6000HE |
| Sample-to-Detector Distance | 90 mm |
| Radiation Source | CuK$_\alpha$ radiation ($\lambda$ = 1.54178 Å) |
| Beam Slit Intensity | 14% of full intensity |
| Sample Temperature | 100 K |
| Sample Orientation | Gandolfi mode |
| Transmission Mode | Debye-Scherer mode |

XRD analyses were performed by mixing each sample with a minimal amount of Krytox® oil in order to hold the solid grains together and adhere the sample to a nylon loop used as a sample mount. Samples were centered on the goniometer of a Rigaku Oxford Diffraction Synergy-S diffractometer equipped with a HyPix6000HE detector and operating with CuK$_\alpha$ radiation ($\lambda$=1.54178 Å). The beam slit was set to position 19 (14% of full intensity). Data were collected in transmission mode (i.e., Debye-Scherer mode) at 100 K with a sample-to-detector distance of 90 mm. Gandolfi scans were performed at multiple kappa angles to obtain data with a 2θ range between 3° and 45°. The Gandolfi mode eliminates the effects from preferred orientation. Examination of the samples under the microscope was also performed to rule out the presence of needles or plates that are prone to preferred orientation.

Example 1

Synthesis of Capsaicin Palmitate (Form P)

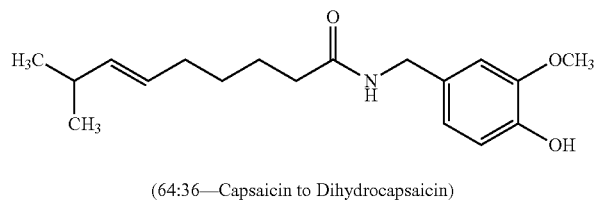

(64:36—Capsaicin to Dihydrocapsaicin)

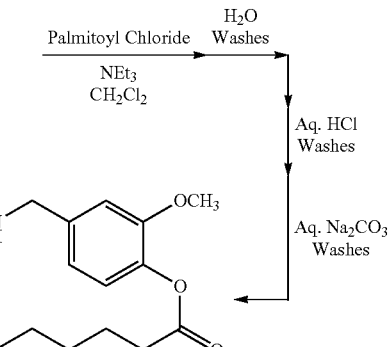

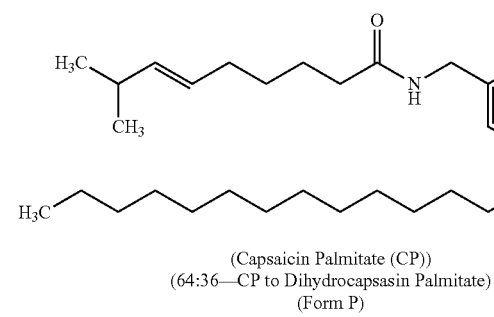

(Capsaicin Palmitate (CP))
(64:36—CP to Dihydrocapsasin Palmitate)
(Form P)

Eight (8) kg of methylene chloride (ACS grade) was added to a clean and dry glass reactor (22 L) equipped with a mechanical blade stirrer (Teflon®), a bottom stopcock, a condenser cooled with water at 25° C., and a solid addition funnel containing 607 g of natural capsaicin (having a 64:36 molar ratio of capsaicin to dihydrocapsaicin) (1.27 moles of capsaicin+0.72 moles of dihydrocapsaicin) (1.9879 moles total). To the stirring methylene chloride at room temperature was then added the natural capsaicin over a period of approximately 5 minutes to obtain a homogenous solution of natural capsaicin in methylene chloride.

The reactor containing the stirring solution of natural capsaicin in methylene chloride was then equipped with a dropwise addition funnel containing 335 mL (2.37 moles) of triethyl amine ($n_D^{20}$=1.4004), and the triethyl amine was then added dropwise to the stirring solution over a period of 10 minutes.

The dropwise additional funnel was then flushed with 50 mL of methylene chloride, and 664 g (2.39 moles) of palmitoyl chloride ($n_D^{20}$=1.4527) was added to the dropwise addition funnel. The palmitoyl chloride was then added dropwise to the stirring methylene chloride/triethyl amine mixture over a period of 10 minutes, and the resulting mixture was heated at reflux for a period of 30 minutes with stirring. After 30 minutes of refluxing, the resulting mixture was allowed to cool and was then stirred at ambient temperature for an additional 18 hours.

First DI Water Wash. After 18 hours of stirring at ambient temperature, 6 L of deionized (DI) water was added to the reaction mixture over 5 minutes via the dropwise addition funnel. Under vigorous stirring (such that a vortex is formed), the resulting biphasic mixture was then stirred for 5 minutes. Mixing was then stopped, and the resulting mixture was allowed to rest until phase separation was complete. The bottom (organic) layer was then drained into an Erlenmeyer flask from the bottom stopcock of the reactor, and the upper (aqueous) layer was drained from the reactor and discarded.

Second DI Water Wash. The reactor was then flushed with 100 mL of DI water, and the organic layer (collected from the First DI Water Wash) was added to the reactor along with 6 L of DI water. The resulting biphasic mixture was mechanically stirred (such that a vortex is formed) for 5 minutes. Stirring was then stopped, and the resulting mixture was allowed to rest until phase separation was complete. The bottom (organic) layer was then drained into an Erlenmeyer flask from the bottom stopcock of the reactor, and the upper (aqueous) layer was drained from the reactor and discarded.

First HCl Wash. The reactor was then flushed with 100 mL of DI water, and the organic layer (collected from the Second DI Water Wash) was added to the reactor along with 6 L of DI water. The resulting biphasic mixture was mechanically stirred (such that a vortex is formed) and 0.6

L of aqueous hydrochloric acid (31.78%) was added via the dropwise addition funnel. The resulting biphasic mixture was then mechanically stirred for 5 minutes. Stirring was then stopped, and the resulting mixture was allowed to rest until phase separation is complete. The bottom (organic) layer was then drained into an Erlenmeyer flask from the bottom stopcock of the reactor, and the upper (aqueous) layer was drained from the reactor and discarded.

Second HCl Wash. The reactor was then flushed with 100 mL of DI water, and the organic layer (collected from the First HCl Wash) was added to the reactor along with 6 L of DI water. The resulting biphasic mixture was mechanically stirred (such that a vortex is formed) and 0.6 L of aqueous hydrochloric acid (31.8%) was added via the dropwise addition funnel. The resulting biphasic mixture was then mechanically stirred for 5 minutes. Stirring was then stopped, and the resulting mixture was allowed to rest until phase separation is complete. The bottom (organic) layer was then drained into an Erlenmeyer flask from the bottom stopcock of the reactor, and the upper (aqueous) layer was drained from the reactor and discarded.

First Carbonate Wash. The reactor was then flushed with 100 mL of DI water, and the organic layer (collected from the Second HCl Wash) was added to the reactor along with 6 L of DI water. The resulting biphasic mixture was mechanically stirred (such that a vortex is formed) and 6 L of aqueous sodium carbonate ($Na_2CO_3$) solution (10% w/w, pH=10.9) was added via the dropwise addition funnel. The resulting biphasic mixture was then mechanically stirred for 5 minutes. Stirring was then stopped, and the resulting mixture was allowed to rest until phase separation was complete. The bottom (organic) layer was then drained into an Erlenmeyer flask from the bottom stopcock of the reactor, and the upper (aqueous) layer was drained from the reactor and discarded.

Second Carbonate Wash. The reactor was then flushed with 100 mL of DI water, and the organic layer (collected from the First Carbonate Wash) was added to the reactor along with 6 L of DI water. The resulting biphasic mixture was mechanically stirred (such that a vortex is formed) and 6 L of aqueous sodium carbonate ($Na_2CO_3$) solution (10% w/w, pH=10.9) was added via the dropwise addition funnel. The resulting biphasic mixture was then mechanically stirred for 5 minutes. Stirring was then stopped, and the resulting mixture was allowed to rest until phase separation was complete. The bottom (organic) layer was then drained into an Erlenmeyer flask from the bottom stopcock of the reactor, and the upper (aqueous) layer was drained from the reactor and discarded.

First RODI Water Wash. Next, the reactor was flushed with 100 mL of DI water, and the organic layer (collected from the Second Carbonate Wash) was added to the reactor along with 6 L of reverse osmosis deionized (RODI) water. The resulting biphasic mixture was mechanically stirred (such that a vortex is formed) for 5 minutes. Stirring was then stopped, and the resulting mixture was allowed to rest until phase separation is complete. The bottom (organic) layer was then drained into an Erlenmeyer flask from the bottom stopcock of the reactor, and the upper (aqueous) layer was drained from the reactor and discarded.

Second RODI Water Wash. Next, the reactor was flushed with 100 mL of DI water, and the organic layer (collected from the First RODI Water Wash) was added to the reactor along with 6 L of reverse osmosis deionized (RODI) water. The resulting biphasic mixture was mechanically stirred (such that a vortex is formed) for 5 minutes. Stirring was then stopped, and the resulting mixture as allowed to rest until phase separation is complete. The bottom (organic) layer was then drained into an Erlenmeyer flask from the bottom stopcock of the reactor, and the upper (aqueous) layer was drained from the reactor and discarded.

The organic layer (collected from the Second RODI Water Wash) was then separated, dried, filtered and the organic filtrate evaporated in a pre-weighed round-bottom flask using a rotary evaporator to obtain 53.6 g (~4.9% yield) of a purified capsaicin palmitate (CP) product as a yellow solid (hereinafter referred to as "Form P" or "CP Form P").

CP Form P was analyzed by HPLC using the conditions summarized in Table 2. As shown in FIG. 2, the Form P contained a mixture of capsaicin palmitate and dihydrocapsaicin palmitate having retentions times of about 19.1 minutes and 21.8 minutes, respectively. In comparison to the HPLC chromatogram of natural capsaicin shown in FIG. 1, it is evident that essentially no capsaicin (as free acid) remained in the CP Form P.

CP Form P was also analyzed by NMR using the conditions summarized in Table 2. FIG. 4 shows the NMR spectrum for a 19.9 mg sample of Form P in $CDCl_3$ using TMS as an internal standard. $^1$H NMR (500 MHz, $CDCl_3$): δ ppm 6.96 (d, J=10.0 Hz, 1H), 6.89 (d, J=1.0 Hz, 1H), 6.84 (d, J=10.0 Hz, 1H), 5.69 (br m, 1H), 5.35 (dd, J1=10 Hz, J2=2.5 Hz, 2H), 4.41 (d, J=7 Hz, 2H), 3.80 (s, 3H), 2.56 (t, J=9.5 Hz, 2H), 2.21 (m, 3H), 1.99 (m, 1H), 1.74 (m, 2H), 1.66 (m, 2H). Based on the NMR spectrum in FIG. 4, the CP Form P contained about 94.5% of the target CP product (having ~64:36 molar ratio of capsaicin palmitate to dihydrocapsaicin palmitate) and about 5.5% of palmitic acid, and no detectable amount of the capsaicin starting material exists.

Example 2

Synthesis of Capsaicin Palmitate (Form T)

A known form of CP was prepared using a methodology based on Examples 1 and 3 described in U.S. Pat. No. 7,943,666 by Singh et al.

A mixture of 30.5.0 g (0.099 moles) of natural capsaicin (0.0634 moles of capsaicin+0.0356 moles of dihydrocapsaicin), with 16.7 mL (0.12 moles) of anhydrous triethylamine, and 200 mL of anhydrous dichloromethane was placed into a 1000 mL 2-neck round-bottomed flask. The flask was fitted with a condenser including a moisture trap on the top and a dropwise addition funnel. While maintaining the flask at room temperature, 32.99 g (0.120 moles) of n-palmitoyl chloride was added from the addition funnel into the mixture with stirring. The mixture was refluxed for 3-6 hours and then stirred for 10-15 hours at room temperature.

The resulting mixture was transferred into a separatory funnel and was washed successively with 2×500 mL of DI water, 2×500 mL of dilute hydrochloric acid, 2×500 mL of 10% sodium bicarbonate ($NaHCO_3$), and 3×500 mL of brine. The organic layer was then separated, and dried overnight with anhydrous magnesium sulfate, filtered, and the organic filtrate was evaporated under vacuum using a rotary evaporator to obtain a capsaicin palmitate product as a yellow solid (hereinafter referred to as "CP Form T" or "Form T").

Example 3

XRD Comparison of Forms P and T

The CP Form P of Example 1 and the CP Form T of Example 2 were each analyzed by X-ray diffraction (XRD) using the conditions summarized in Table 3.

Figure 5:
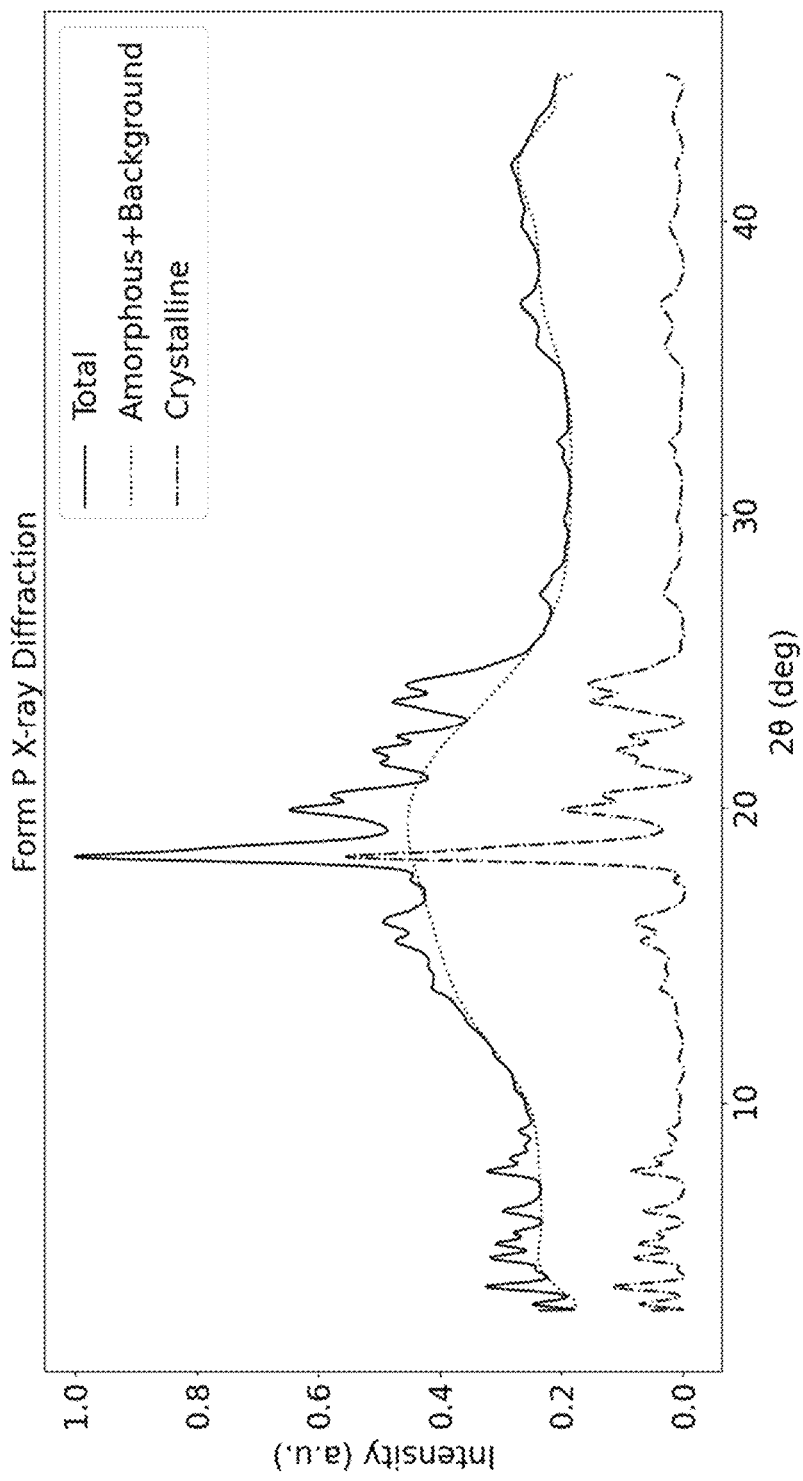
FIG. 5 is an XRD diffraction pattern of the capsaicin palmitate prepared in Example 1 (Form P)
Figure 6:
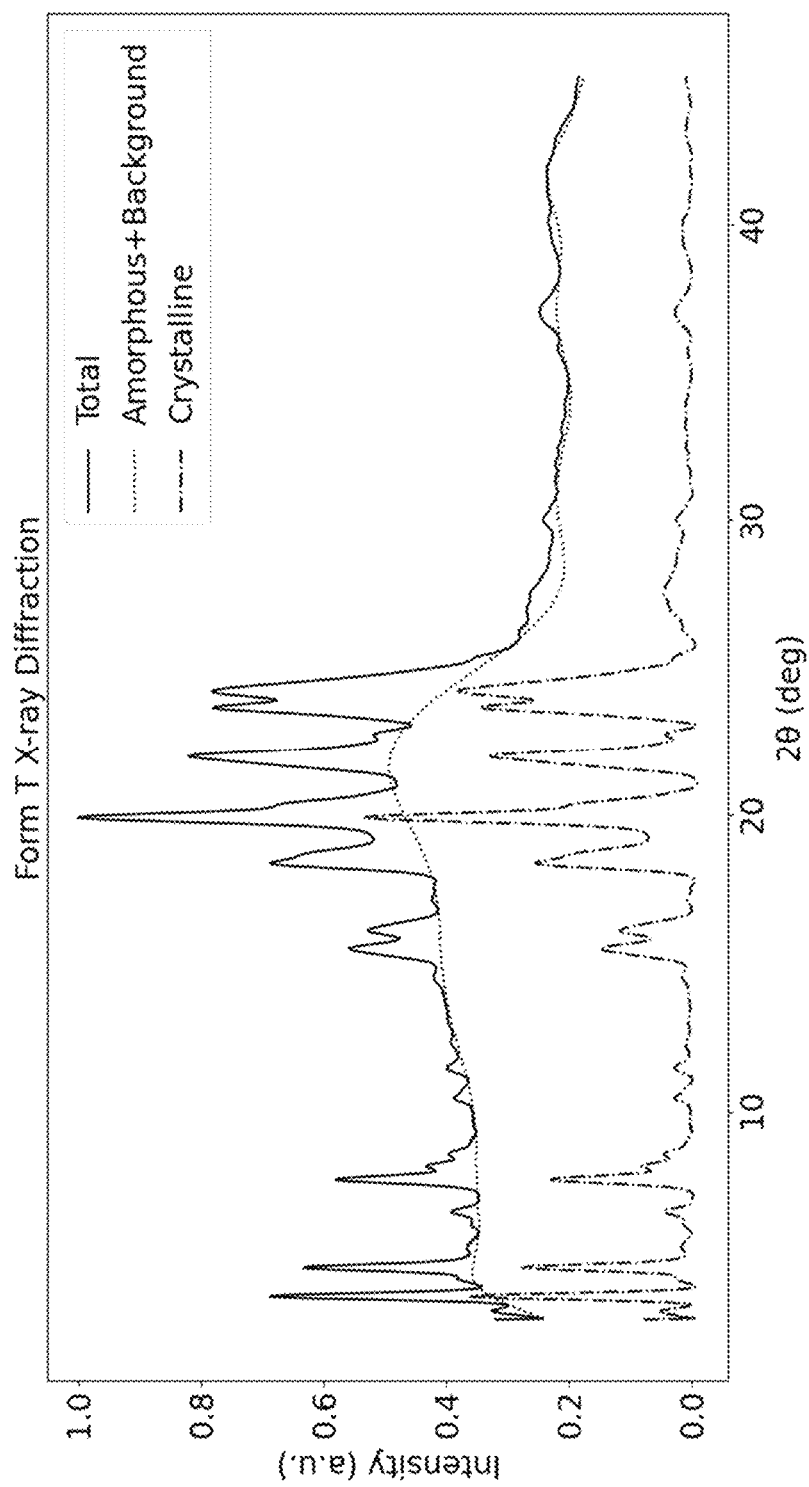
FIG. 6 is an XRD diffraction pattern of the capsaicin palmitate prepared in Example 2 (Form T)

FIG. 5 shows the XRD diffraction pattern for the CP Form P (Example 1), and FIG. 6 shows the XRD diffraction pattern for the comparative CP Form T (comparative Example 2).

In each of FIGS. 5 and 6, the "total" signal (solid line) indicates the presence of a crystalline phase (characterized by well-defined peaks) and an amorphous phase (characterized by one or more broad "halos"). The baseline signal (dotted line) was generated from the total signal using the Python algorithm "pybaselines" with a $20^{th}$ order polynomial fit and corresponds to the signal from the amorphous phase as well as background. The baseline signal (dotted line) was then subtracted from the total signal (solid line) to obtain a normalized signal (hashed line) corresponding to the crystalline phase. Finally, the normalized signal (hashed line) was numerically analyzed.

Figure 7:
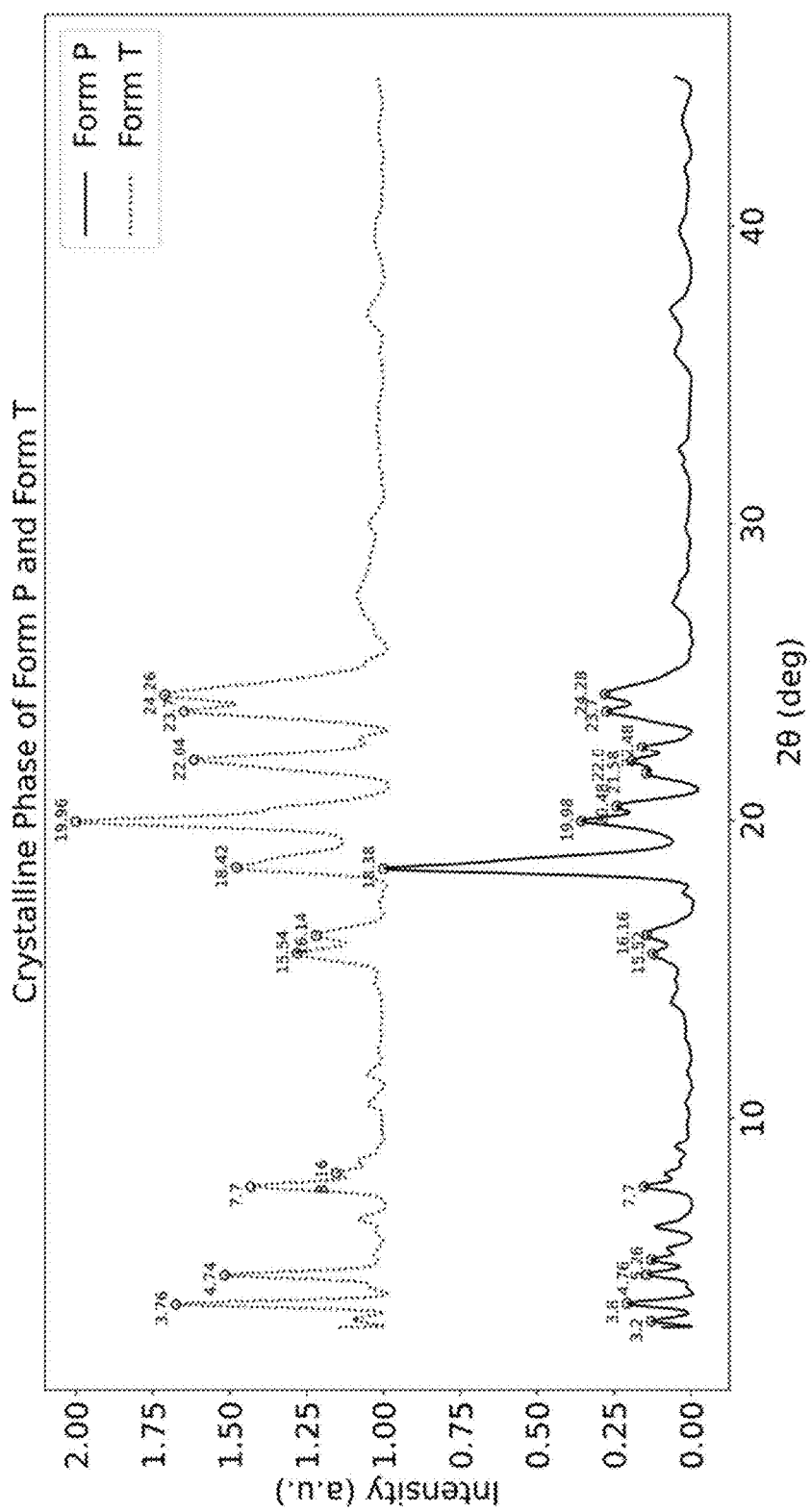
FIG. 7 compares the normalized (crystalline phase) signals of the Forms P and T.

FIG. 7 compares the normalized (crystalline phase) signals of the Forms P and T. There are many overlapping peaks located at the same (or nearly the same) 2θ position; however, the relative intensities of the overlapping peaks are different for the Forms P and Form T. This suggests that the crystalline phases of the Forms P and T are each composed of two or more different solid forms in different proportions. The 2θ positions and the relative intensities of the peaks for the Forms P and T are tabulated in Tables 4 and 5.

TABLE 4

XRD Diffraction Peaks for CP Form P (Example 1)

| 2θ (deg) (±0.2) | (I/I$_o$) | Crystal |
|---|---|---|
| 3.20 | 0.1295 | A |
| 3.80 | 0.2077 | B |
| 4.76 | 0.1429 | B |
| 5.26 | 0.1282 | A |
| 7.70 | 0.1528 | B |
| 15.52 | 0.1238 | B |
| 16.16 | 0.1429 | B |
| 18.38 | 1.0000 | A |
| 19.98 | 0.3557 | B |
| 20.48 | 0.2411 | A |
| 21.58 | 0.1444 | A |
| 22.00 | 0.1941 | B |
| 22.48 | 0.1584 | A |
| 23.70 | 0.2750 | B |
| 24.28 | 0.2796 | B |

TABLE 5

XRD Diffraction Peaks for Comparative CP Form T (Example 2)

| 2θ (deg) (±0.2) | (I/I$_o$) | Crystal |
|---|---|---|
| 3.76 | 0.6746 | B |
| 4.74 | 0.5167 | B |
| 7.70 | 0.4311 | B |
| 8.16 | 0.1536 | B |
| 15.54 | 0.2804 | B |
| 16.14 | 0.2193 | B |
| 18.42 | 0.4788 | A |
| 19.96 | 1.0000 | B |
| 22.04 | 0.6154 | B |
| 23.70 | 0.6480 | B |
| 24.26 | 0.7123 | B |

As shown in Table 4, the largest peak (I/I$_o$=1) of Form P occurs at 2θ≈18.38°, with the next largest peak (I/I$_o$≈0.3557) occurring at 2θ≈19.98°. In contrast, the largest peak (I/I$_o$=1) of Form T in Table 5 occurs at 2θ≈19.96°, with a smaller peak (I/I$_o$≈0.4788) at 2θ≈18.42°. Because the peak intensities at 2θ≈18.38° and 2θ≈19.96° are different for the Forms P and T, this suggests the presence of at least two crystalline forms having different ratios in the Forms P and T. Assigning the peak at 2θ≈18.38° to Crystal A, and the peak at 2θ≈19.96° to Crystal B, and with the assumption that there are no other crystals present, equations relating the intensity of diffraction data for the forms P and T to the corresponding data for the crystals A and B are shown below as equations (1) and (2).

$$S_P(2\theta) \approx S_A(2\theta) + 0.3577 S_B(2\theta) \tag{1}$$

$$S_T(2\theta) \approx 0.4788 S_A(2\theta) + S_B(2\theta) \tag{2}$$

where $S_P(2\theta)$, $S_T(2\theta)$, $S_A(2\theta)$, and $S_B(2\theta)$ are the diffraction patterns for Form P, Form T, Crystal A, and Crystal B, respectively, and all diffraction patterns are normalized so that the maximum peak is unity. The coefficient of 0.3577 in Equation (1) corresponds to the intensity of the peak at 2θ≈19.980 for Form P, and the coefficient of 0.4788 in Equation (2) corresponds to the intensity of the peak at 2θ≈18.420 for Form T.

Equations (1) and (2) represent two equations with two unknowns, i.e., $S_A$ and $S_B$. Using algebraic manipulation, the diffraction patterns for Crystal A and Crystal B may be then expressed as:

$$S_A(2\theta) \approx 1.2067 S_P(2\theta) - 0.4316 S_T(2\theta) \tag{3}$$

$$S_B(2\theta) \approx 1.2067 S_T(2\theta) - 0.5777 S_P(2\theta) \tag{4}$$

Figure 8:
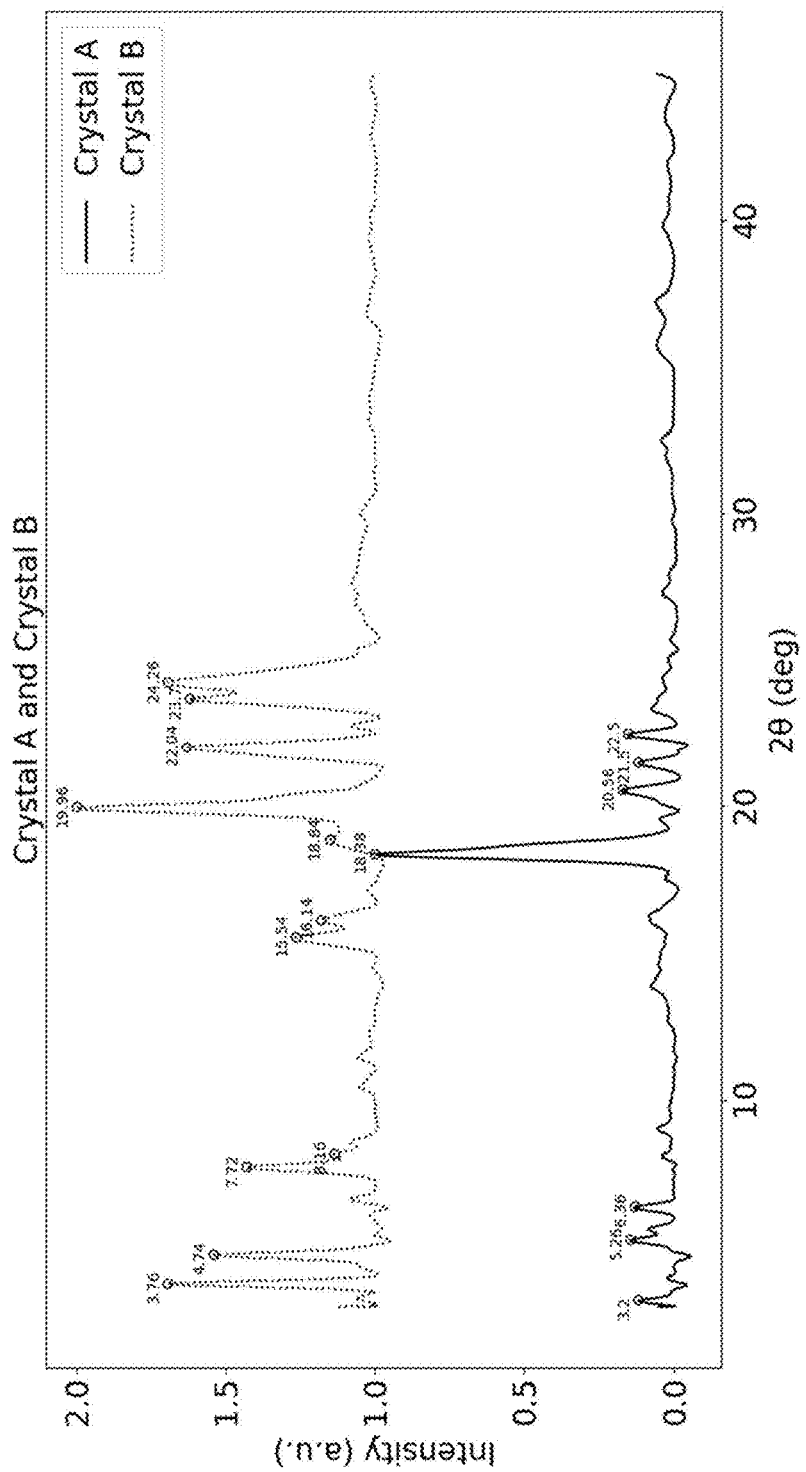
FIG. 8 compares the X-ray diffraction patterns for the Crystal A and the Crystal B.

FIG. 8 shows the diffraction patterns for Crystals A and B, which were calculated using Equations (3) and (4). The peaks are distinct for the two crystals, which indicates that the spectrograms for the Form P and the Form T were correctly separated into contributions from the Crystals A and B, and that there are no other crystals present in either the Form P or the Form T. The 2θ positions and the relative intensities of the peaks for Crystals A and B are respectively shown in Tables 7 and 8 below, as well as the corresponding d-spacing for each peak, as calculated by the Bragg relationship for λ=1.54178 Å. In Tables 4 and 5, each peak measured for Form P and Form T is assigned to either Crystal A or Crystal B based on the corresponding peaks found in Table 6 and 7, respectively.

TABLE 6

XRD Diffraction Peaks for Crystal A

| 2θ (deg) (±0.2) | (I/I$_o$) | d-spacing (Å) (±0.2) |
|---|---|---|
| 3.20 | 0.1179 | 27.59 |
| 5.26 | 0.1459 | 16.79 |
| 6.36 | 0.1298 | 13.89 |
| 18.38 | 1.0000 | 4.82 |
| 20.56 | 0.1719 | 4.32 |
| 21.50 | 0.1186 | 4.13 |
| 22.50 | 0.1528 | 3.95 |

TABLE 7

XRD Diffraction Peaks for Crystal B

| 2θ (deg) (±0.2) | (I/I$_o$) | d-spacing (Å) (±0.2) |
|---|---|---|
| 3.76 | 0.6948 | 23.48 |
| 4.74 | 0.5416 | 18.63 |
| 7.72 | 0.4311 | 11.44 |
| 8.16 | 0.1367 | 10.83 |
| 15.54 | 0.2665 | 5.70 |
| 16.14 | 0.1820 | 5.49 |
| 18.84 | 0.1529 | 4.71 |

TABLE 7-continued

XRD Diffraction Peaks for Crystal B

| 2θ (deg) (±0.2) | (I/I₀) | d-spacing (Å) (±0.2) |
|---|---|---|
| 19.96 | 1.0000 | 4.44 |
| 22.04 | 0.6313 | 4.03 |
| 23.70 | 0.6213 | 3.75 |
| 24.26 | 0.6962 | 3.67 |

The spectrograms shown in FIGS. 6 and 7 also show contributions from the crystalline phase, the amorphous phase, and a background signal which is not due to the sample under measurement. To determine the degree of crystallinity of the Forms P and T, it is necessary to separate the amorphous phase signal from the background signal. A diffraction pattern for only the sample holder was obtained, which is representative of the background signal present in FIGS. 5 and 6.

Figure 9:
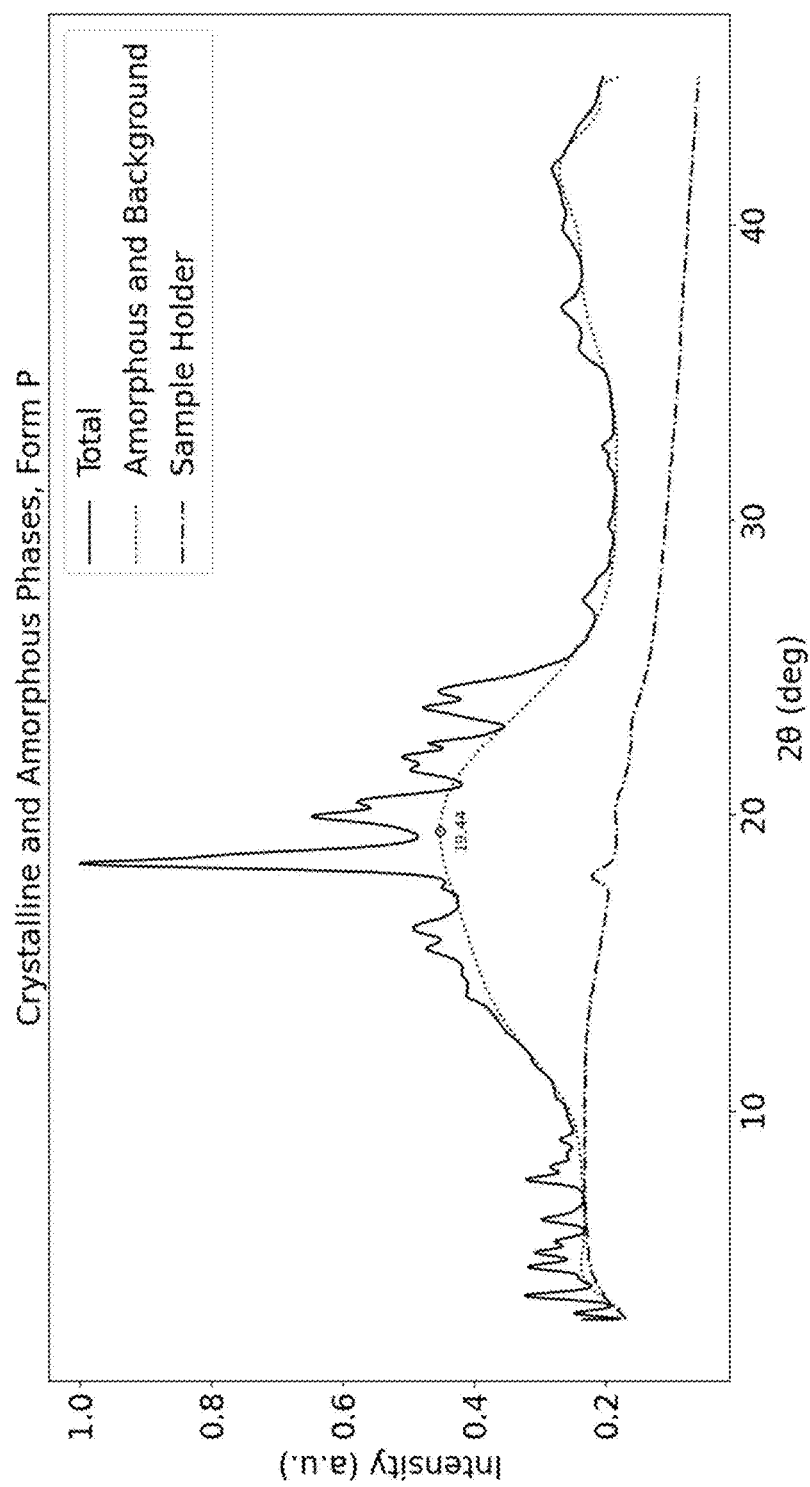
FIG. 9 shows the XRD patterns for crystalline and amorphous phases for the Form P.
Figure 10:
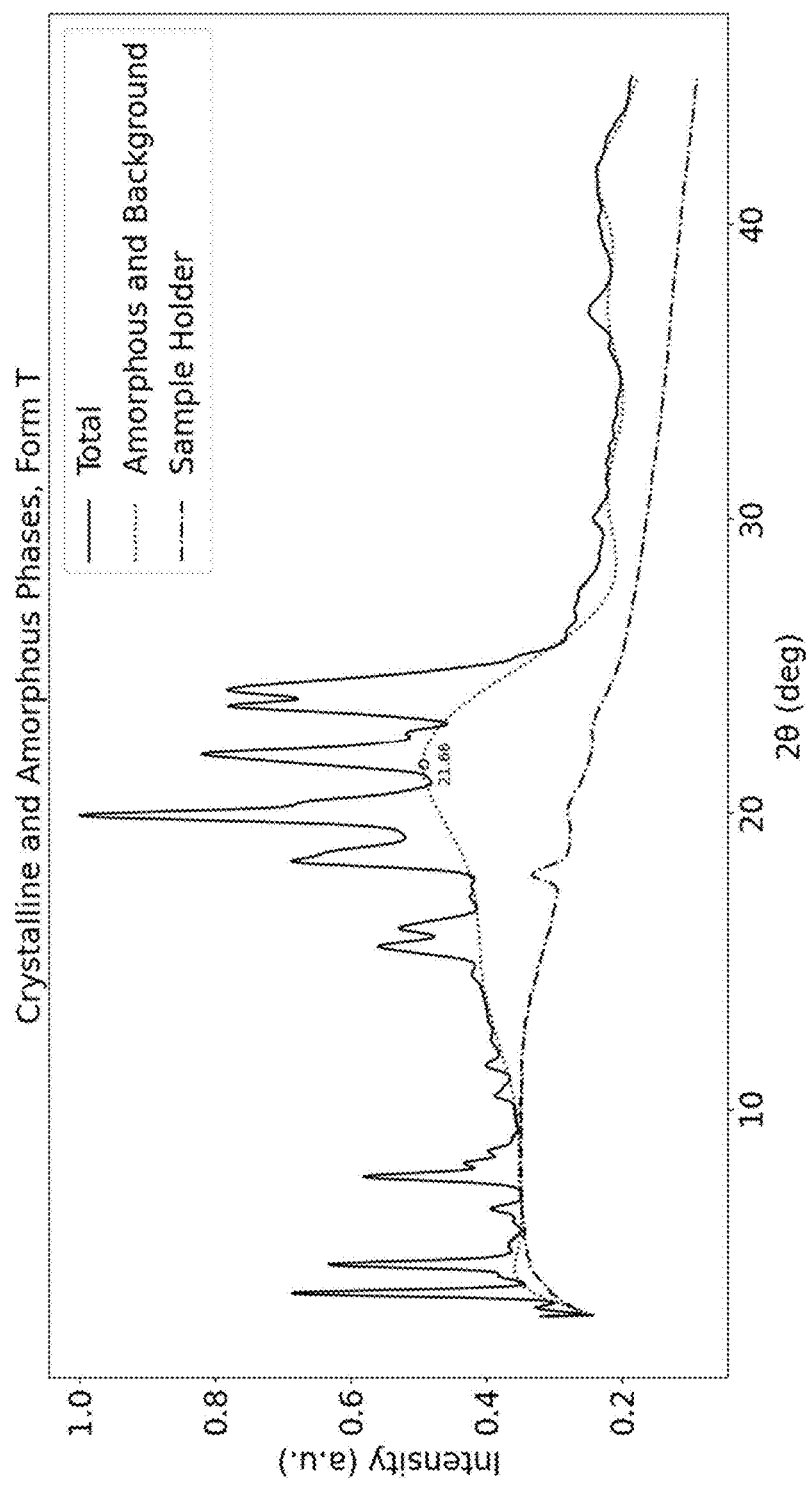
FIG. 10 shows the XRD patterns for crystalline and amorphous phases for the Form T.

FIG. 9 includes the diffraction pattern from the sample holder (partially dashed) plotted with the total diffraction patterns (solid line) for the Form P along with the calculated baseline (dotted line), representing the amorphous and background components, and FIG. 10 includes the diffraction pattern from the sample holder (partially dashed) plotted with the total diffraction pattern (solid line) for the Form T along with the calculated baseline (dotted line), representing the amorphous and background components. In these figures, the diffraction pattern for the sample holder is scaled so that the flat portion of the calculated baseline at 2q=7° matches the flat portion of the spectrogram of the sample holder at that same position. The crystalline fraction ($X_c$) can then be calculated using equation (5) below, and the amorphous fraction ($X_a$) is considered to be the remainder:

$$X_c = A_c/(A_c + A_a), \quad (5)$$

where the crystalline area, $A_c$, is the area between the total spectrogram (solid line) and the amorphous plus background (baseline, dotted line) diffraction pattern, and $A_a$ is the area between the amorphous plus background (baseline, dotted line) diffraction pattern and the diffraction pattern for the sample holder (partially dashed), as shown in FIGS. 9 and 10. $X_c$ for Form P is calculated to be 20% (i.e., the Form P is 20% crystalline and 80% amorphous), and $X_c$ for Form T is 35% (i.e., the Form T is 35% crystalline and 65% amorphous).

Unlike the crystalline phases which produce diffraction patterns having narrow peaks, the diffraction patterns of amorphous phases consist of wide "halos". For Form P, the halo with the largest amplitude occurs at 2q≈19.44°, and for Form T, the halo with the largest amplitude occurs at 2q≈21.660—indicating that the structures of the amorphous phases are different for the Forms P and T.

The X-ray diffraction data for Form P and Form T show differences which can be used to discriminate between these solid forms. The differences are summarized Table 8 below.

TABLE 8

XRD Diffraction Peaks for Crystal B

| Characteristic | Form P | Form T |
|---|---|---|
| Position of largest peak | 2θ≈18.38° ± 0.2° | 2θ≈19.96° ± 0.2° |
| Relative intensity of peaks | Table 6 | Table 7 |
| Crystalline fraction | 20% | 35% |

TABLE 8-continued

XRD Diffraction Peaks for Crystal B

| Characteristic | Form P | Form T |
|---|---|---|
| Predominant Crystal | Crystal A | Crystal B |
| Position of largest amorphous halo | 2θ≈19.44° ± 0.2° | 2θ≈21.66° ± 0.2° |

Example 4

DSC Comparison of Forms P and T

Figure 11:
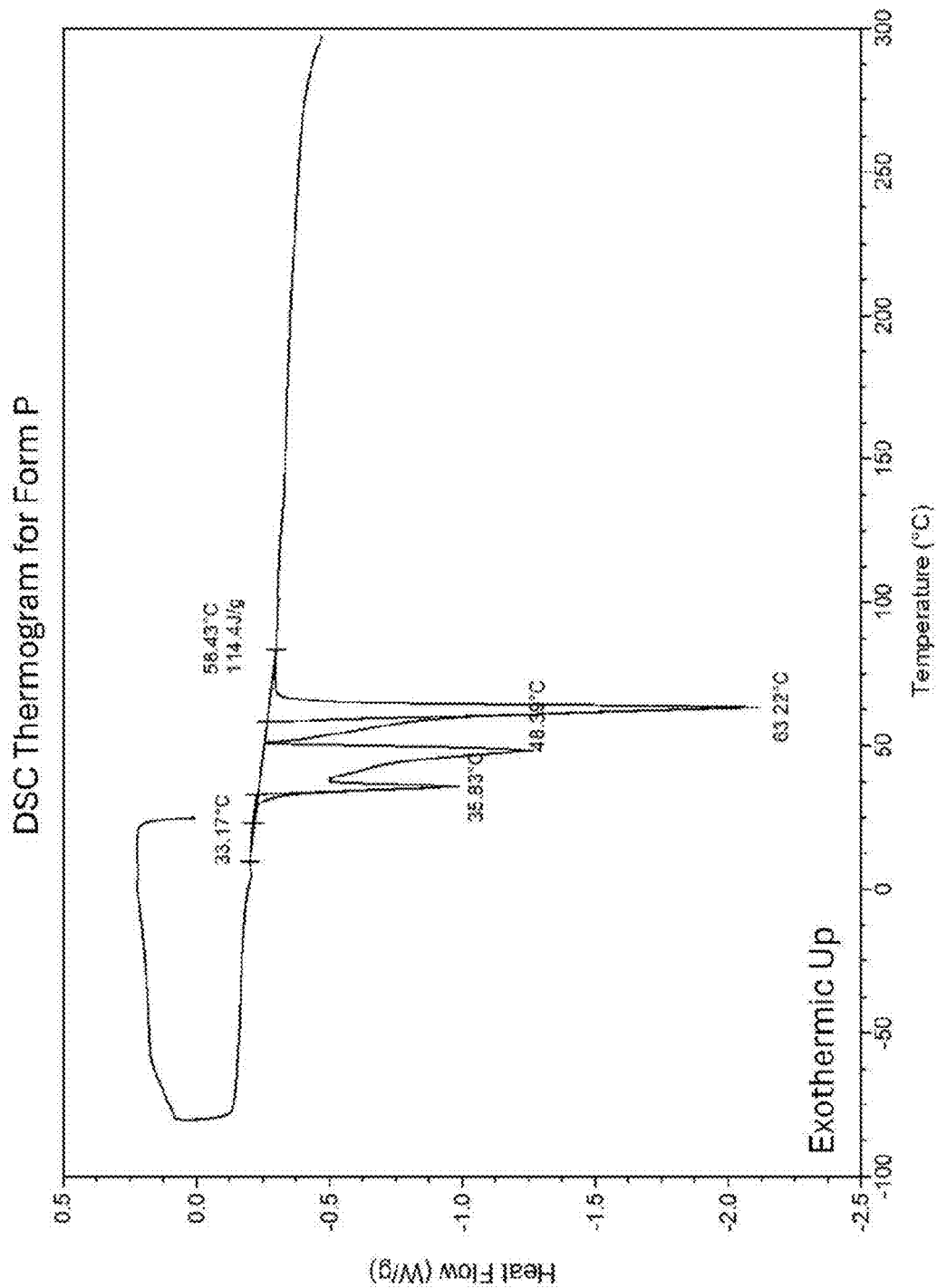
FIG. 11 shows a Differential Scanning Calorimetry thermogram tracing of Form P.
Figure 12:
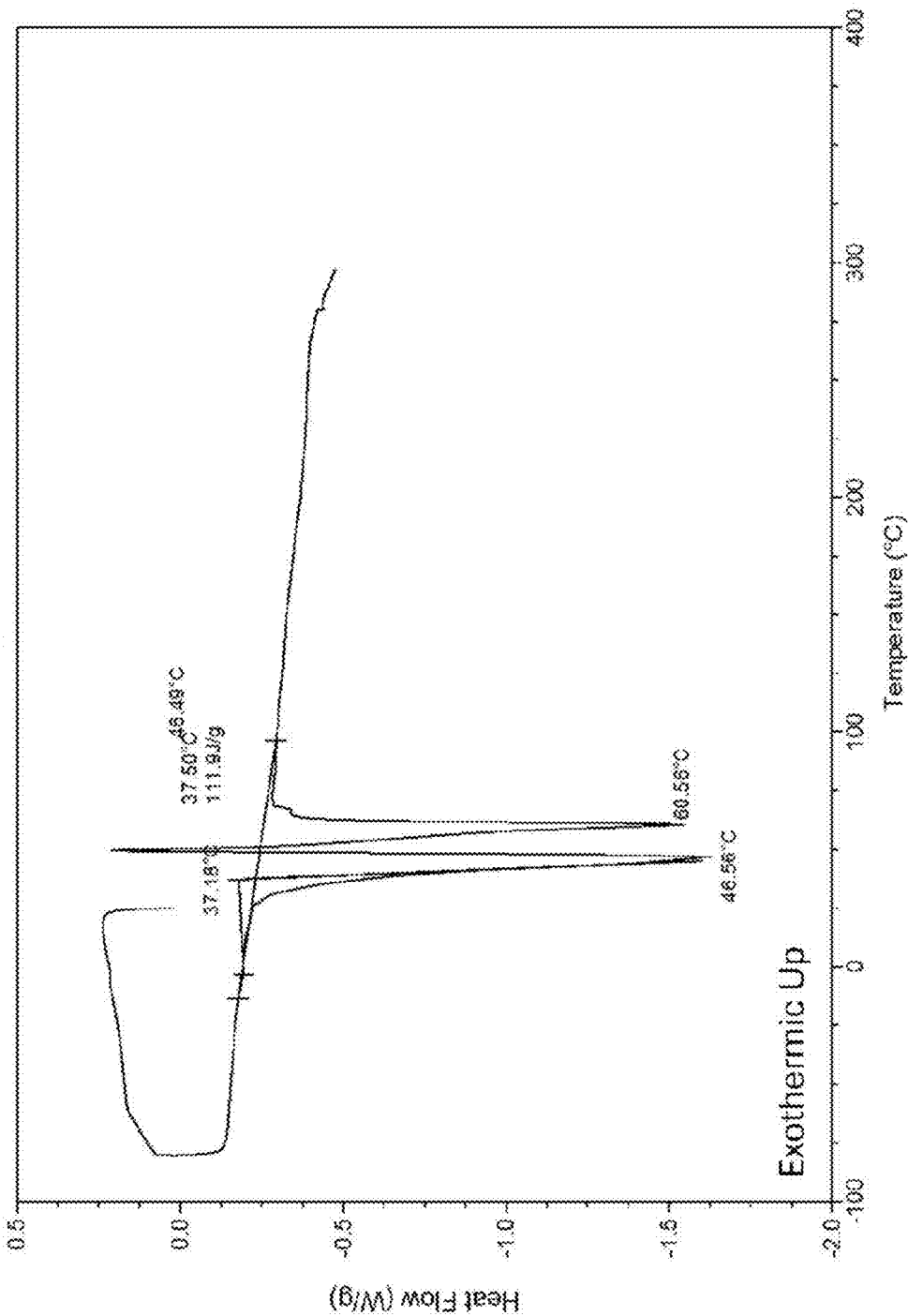
FIG. 12 shows a Differential Scanning Calorimetry thermogram tracing of Form T.

The Forms P and T were analyzed using differential scanning calorimetry (DSC). The DSC measurements were performed using a TA Instruments Q2000 using indium for temperature calibration. For each measurement, approximately 3 to 5 mg of the sample was weighed into a Tzero aluminum pan that was covered with a lid, crimped and loaded into the DSC instrument. An empty pan of the same configuration was loaded into the reference position. The sample was heated from −30° C. to 75° C., equilibrated at 75° C., cooled to −30° C. at a rate of 10° C./min, equilibrated at −30° C., and then heated to 100° C. at 10° C./min. The DSC cell was kept under a nitrogen purge of about 50 mL per minute during each analysis. Data collection was performed using Thermal Advantage 5.5.3 software, and data analysis was performed using Trios v5.0.0.44608. FIGS. 11 and 12 show the DSC thermograms for Forma P and T respectively.

DSC traces of Forms P and T were collected starting at room temperature, then cooling to −80° C. and subsequently heating past the melting point (300° C.). Forms P and T ultimately melt at a similar temperature of about 62° C. Both samples showed multiple thermal events between approximately 30 and 70° C. Form P shows three convoluted endothermic events peaking at 35.8, 48.4 and 60.6° C.—with an additional shoulder occurring between the first and second event. The second and third event appear to be completely resolved as the signal reaches the baseline, although the steep slope near the baseline is atypical. Form T shows only two endotherms separated by an exothermic range. A series of endo-exo-endotherms are indicative of melt-recrystallization of a lower melting crystalline phase followed by melting of a higher-melting crystalline phase. A shoulder on the low temperature side of the first event appears to coincide with the shoulder for the second event for Form P.

Form P shows three endotherms, whereas Form T shows only two. It is likely that there are two phases involved in the endotherm, where this may also indicate different orientations of the molecular interactions. There were potentially multiple phase transition events between 30° C. and 47° C. with melting points at 62-64° C.

Example 5

Variable Temperature PXRD Analysis

Preparation of Form C

Based on the DSC comparison of Example 4, it was theorized that changes in the crystalline structure of Forms P and T may occur at elevated temperatures. To study the changes in crystalline structure with temperature, Variable Temperature Powder X-ray Diffraction (VT-PXRD) was conducted on the Forms P and T in the same temperature range as the DSC thermal events. The PRXD conditions are summarized in Table 9 below.

TABLE 9

| PXRD method conditions | |
|---|---|
| Instrument | Rigaku SmartLab X-Ray Diffractometer |
| Detector | HyPix 3000 |
| Geometry | Bragg-Brentano |
| Tube Anode | Cu |
| Tube Type | Long Fine Focus |
| Tube Voltage (kV) | 40 |
| Tube Current (mA) | 50 |
| Monochromator | Ni foil Cu Kβ filter |
| Incident Slit (°) | 1/3 |
| Receiving Slit 1 (mm) | 18.0 |
| Receiving Slit 2 (mm) | 20.1 |
| Start Angle 2θ (°) | 2 |
| End Angle 2θ (°) | 40 |
| Step Size (°) | 0.02 |
| Scan Speed (°/min) | 6 |
| Spinning (rpm) | 11 |
| Sample Holder | Si zero background |
| Sample Temperature | Variable Target |

Temperature changes were performed using an Anton Paar CHC+ variable temperature/humidity chamber and an Anton Paar CCU 100 controller. The temperature of the sample chamber exterior was kept at 20 C using a Julabo Corio CD-201F refrigerated circulator. The cooling mode of the sample holder was passive.

The temperature cycling for the two samples began at room temperature (RT). Data collection was started when the target temperature was reached and, at each temperature, the VT-PXRD patterns were collected back-to-back for a total of about 30 minutes. Data collection during cooling started directly after the heating was turned off. The patterns collected were separated by 15 minute-holding times for a total of just over 3 hours with subsequent cooling scans to room temperature.

When the samples were heated to and held at 35° C., there were few discernable changes in the VT-PXRD pattern compared to the starting material. When heated to 45 and 47° C., the peaks seen at RT began to diminish. At 52° C., new peaks appear, indicative of a new and different crystal phase. At 62-64° C., most of these new peaks disappear, and the samples appeared to be melted and translucent. The moment the heating was turned off, the samples became opaque and the PXRD pattern peaks present at 52° C. reappeared, indicating the sampled re-crystalized.

Figure 13:
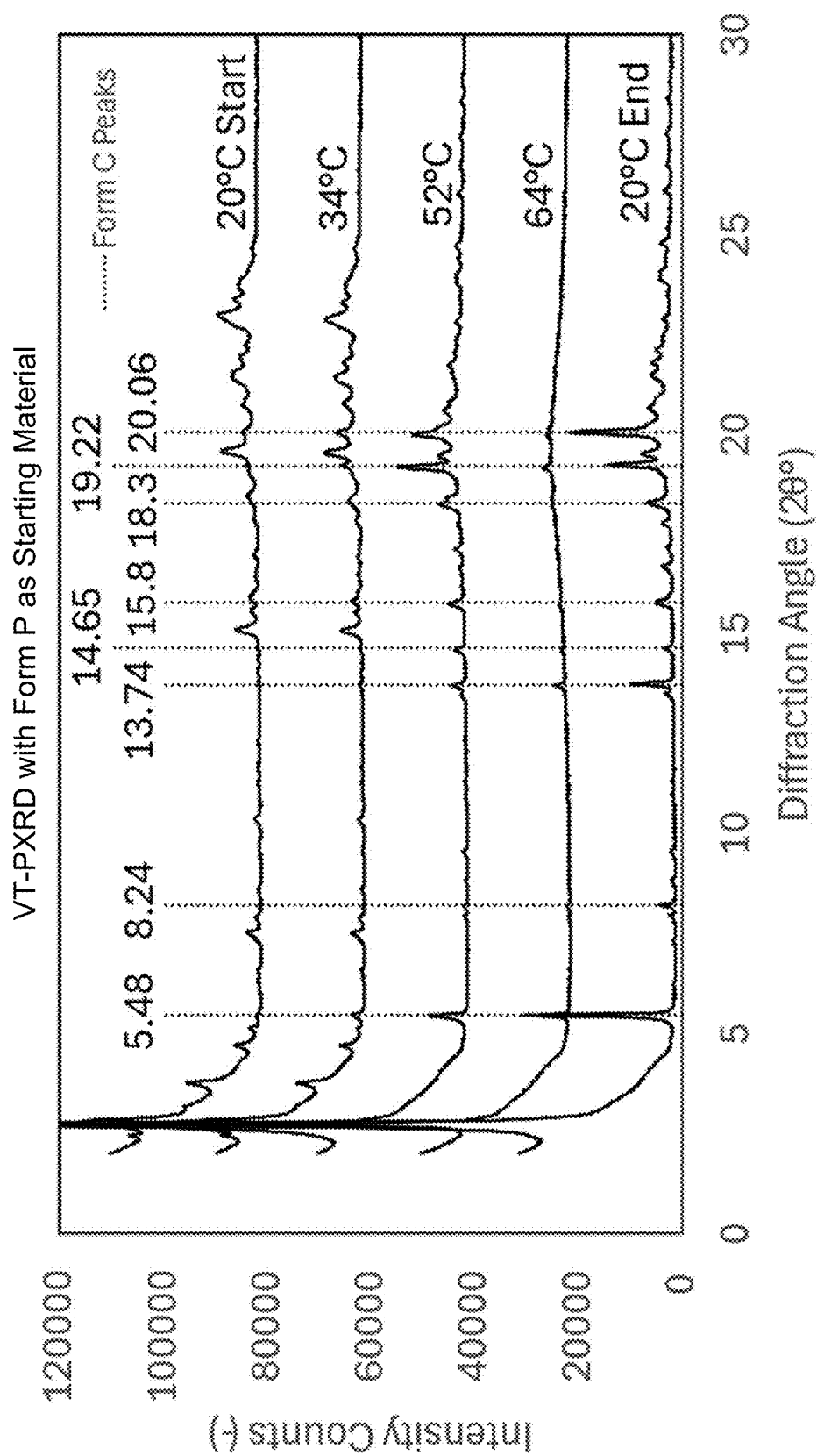
FIG. 13 shows variable temperature Powder XRD of the Form P leading to formation of Form C.
Figure 14:
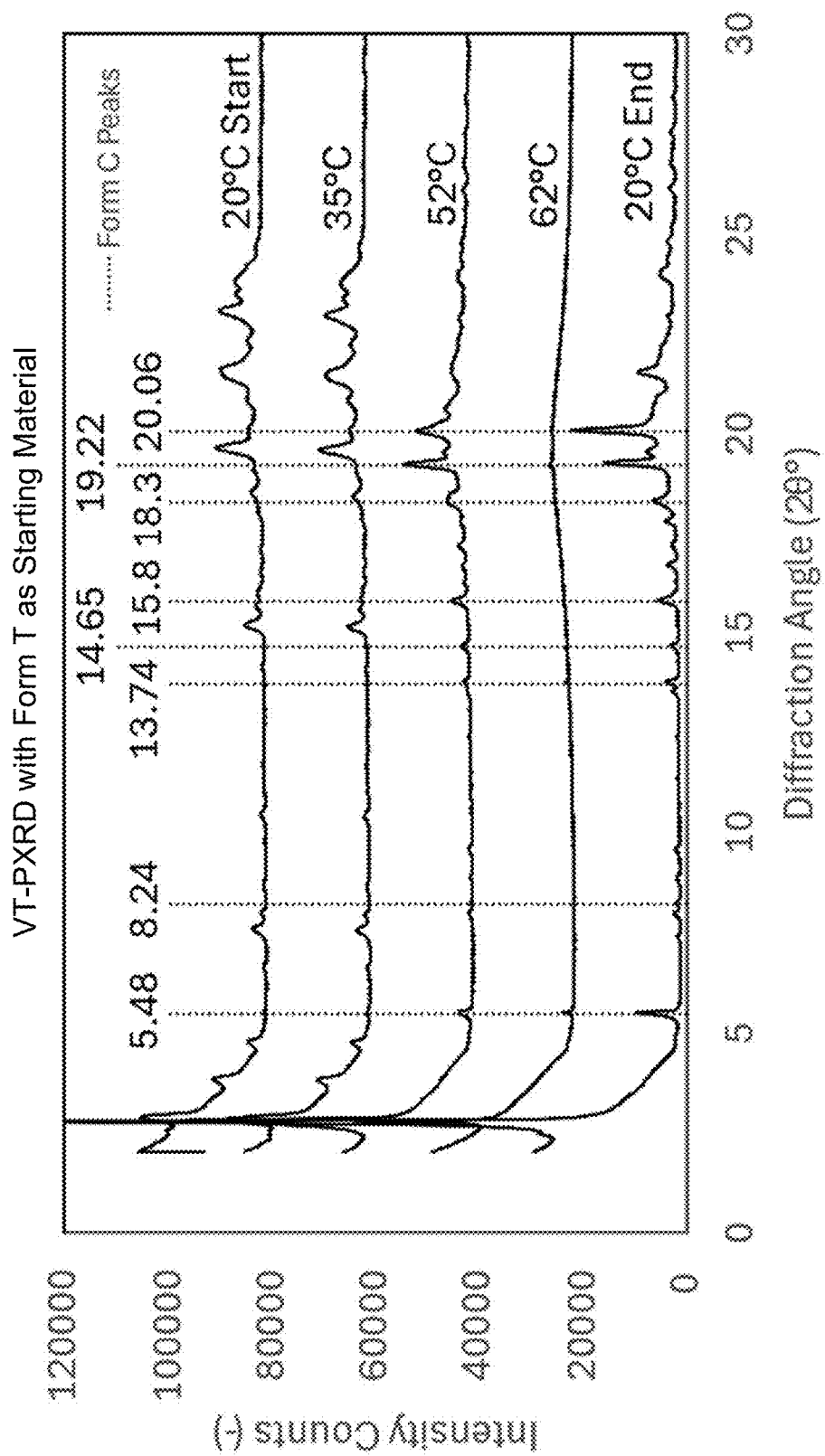
FIG. 14 shows variable temperature Powder XRD of the Form T leading to formation of Form C.

As indicated by peak transitions from starting material P and T after cooling to room temperature (RT), it was found that recrystallization of the Forms P and T each produced phase transitions to a new crystalline Form C. As shown in FIGS. 13 and 14, the room temperature peaks after the heating/cooling cycle were identical for the Form P (FIG. 13) and the Form T (FIG. 14). This data shows that the Crystals A and B both underwent conversions to a stable and unique polymorphic form referred to herein as "Form C" or "CP Form C"—which is predominantly composed of a new Crystal C.

As shown in FIGS. 13 and 14, the Form C peaks were present at 52° C. where the initial Form P and Form T peaks disappear before reaching 52° C. The Form C peaks were not present (except for a very weak peak at 5.48°) at RT for either Forms P and T. The Form C peaks diminish during the melt at 62° C./64° C., reappearing after cooling back to RT. The Forms P and Form T transitions included a remarkably large peak formation at 2θ≈5.48°. The distinctive 2θ peaks for the Form C are tabulated in Table 10.

TABLE 10

| PXRD Diffraction Peaks for CP Form C | |
|---|---|
| 2θ (deg) (±0.2) | Crystal |
| 5.48 | C |
| 8.24 | C |
| 13.74 | C |
| 14.65 | C |
| 15.80 | C |
| 18.30 | C |
| 19.22 | C |
| 20.06 | C |

Example 6

Preparation of Topical Analgesic Cream Containing CP Form C

The CP Form C of Example 5 was used to prepare a topical analgesic cream having the composition summarized in Table 10 below.

In a main tank were combined the Phase A components with mechanical stirring at 70-75° C. to obtain a uniform (liquid) mixture. In a separate tank were combined the Phase B components with mechanical stirring at 70-75° C. to obtain a uniform (liquid) mixture. With both Phases A and B at 70-75° C., the Phase B mixture was slowly added to the Phase A mixture, and the resulting mixture was mechanically stirred at 70-75° C. to obtain a uniform (liquid) mixture. The Phase A/B mixture wax then cooled to 40-45° C. with mechanical stirring and, with the Phase A/B mixture at or below 45° C., Phase C was added with mechanical stirring and stirring was continued until the resulting Phase A/B/C mixture was uniform. Next, in a separate tank, the Phase D components were combined and heated with mechanical stirring until uniform (free of undissolved solids) while maintaining a temperature of 40-45° C. With both phases at 40-45° C., the Phase D mixture was then added to the Phase A/B/C mixture, and the resulting mixture was mechanically stirred until smooth and uniform to obtain the topical analgesic cream of Table 11.

TABLE 11

| Composition of Topical Analgesic Cream Containing CP Form C | | |
|---|---|---|
| Weight Content (%) | Component | Weight (g) |
| Phase A | | |
| 68.16 | Water | 477.12 |
| 5.0 | Vegetable Glycerin | 35.0 |
| Phase B | | |
| 7.0 | Helianthus Annuus (Sunflower Oil) | 49.0 |
| 0.99 | Butyrospermum Parkii (Shea Butter) | 6.93 |
| 3.0 | Cetiol ® MM (BASF/Dewolf) or Jeechem ® MM (Jeen) | 21.0 |
| 3.5 | Cetyl Alcohol | 24.5 |
| 2.5 | Ceteareth-20 | 17.5 |
| 3.5 | Glyceryl Stearate | 24.5 |
| 2.5 | Stearic Acid | 17.5 |

TABLE 11-continued

Composition of Topical Analgesic Cream Containing CP Form C

| Weight Content (%) | Component | Weight (g) |
|---|---|---|
| Phase C | | |
| 1.0 | Euxyl PE 9010 | 7.0 |
| Phase D | | |
| 0.45 | Capsaicin Palmitate (Form C) | 3.15 |
| 1.5 | Tween 80 | 10.5 |
| 0.9 | Coconut Oil | 6.3 |
| 100.0 | | 700.00 |

The various embodiments described above can be combined to provide further embodiments. All of the U.S. patents, U.S. patent application publications, U.S. patent applications, foreign patents, foreign patent applications and non-patent publications referred to in this specification, including U.S. Provisional Patent Application No. 63/504,132, filed May 24, 2023, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by this disclosure.

What is claimed is:

1. A solid form of capsaicin palmitate, comprising a compound of

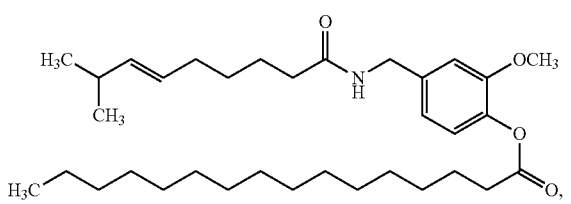

(I)

or a solvate, hydrate or isotope thereof, wherein the solid form is characterized by an X-ray diffraction pattern comprising at least one peak position, in degrees 2θ (±0.2°), selected from the group consisting of 5.48, 13.74, 19.22 and 20.06.

2. The solid form of claim 1, wherein the X-ray diffraction pattern comprises at least two peak positions, in degrees 2θ (±0.2°), selected from the group consisting of 5.48, 13.74, 19.22 and 20.06.

3. The solid of claim 1, wherein the X-ray diffraction pattern comprises at least three peak positions, in degrees 2θ (±0.2°), selected from the group consisting of 5.48, 13.74, 19.22 and 20.06.

4. The solid form of claim 1, wherein the X-ray diffraction pattern comprises peak positions, in degrees 2θ (±0.2°), selected from the group consisting of 5.48, 13.74, 19.22 and 20.06.

5. The solid form of claim 1, wherein the X-ray diffraction pattern comprises peak positions, in degrees 2θ (0.2°), of 5.48, 13.74, 19.22 and 20.06, and at least one peak position selected from the group consisting of 8.24, 14.65, 15.80 and 18.30.

6. The solid form of claim 1, wherein the X-ray diffraction pattern comprises peak positions, in degrees 2θ (0.2°), of 5.48, 13.74, 19.22 and 20.06, and at least two peak positions selected from the group consisting of 8.24, 14.65, 15.80 and 18.30.

7. The solid form of claim 1, wherein the X-ray diffraction pattern comprises peak positions, in degrees 2θ (±0.2°), selected from the group consisting of 5.48, 8.24, 13.74, 14.65, 15.80, 18.30, 19.22 and 20.06.

8. The solid form of claim 1, further comprising at least one palmitate ester formed from a congener of capsaicin.

9. The solid form of claim 1, further comprising a compound of formula (II):

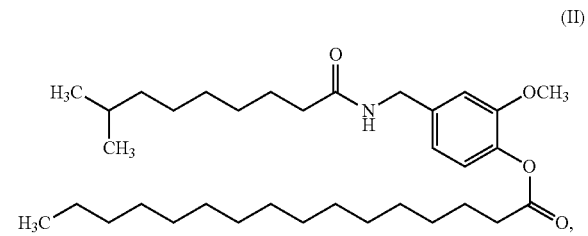 [SMILES: CCCCCCCCCCCCCCCC(=O)Oc1ccc(CNC(=O)CCCCCCC(C)C)cc1OC]

(II)

or a solvate, hydrate or isotope thereof.

10. A pharmaceutical composition, comprising:
a solid form of claim 1; and
at least one selected from the group consisting of an antioxidant, an emollient, an emulsifier, a moisturizer, a preservative and a surfactant.

11. The pharmaceutical composition of claim 10, comprising at least one antioxidant.

12. The pharmaceutical composition of claim 10, comprising at least one emollient.

13. The pharmaceutical composition of claim 10, comprising at least one emulsifier.

14. The pharmaceutical composition of claim 10, comprising at least one moisturizer.

15. The pharmaceutical composition of claim 10, comprising at least one preservative.

16. The pharmaceutical composition of claim 10, comprising at least one surfactant.

17. The pharmaceutical composition of claim 10, comprising at least one selected from the group consisting of vegetable glycerin, sunflower oil, shea butter, Cetiol® MM (tetradecanoic acid, tetradecyl ester), Jeechem® MM (myristic acid, myristyl ester), cetyl alcohol, Ceteareth-20 (polyethylene glycol ether of cetearyl alcohol), glyceryl stearate, stearic acid, Euxyl® PE 9010 (phenoxyethanol/ethylhexylglycerin), Tween 80 (polysorbate 80, polyoxyethylene sorbitan monooleate) and coconut oil.

18. The pharmaceutical composition of claim 10, comprising vegetable glycerin, sunflower oil, shea butter, Cetiol® MM (tetradecanoic acid, tetradecyl ester) or Jeechem® MM (myristic acid, myristyl ester), cetyl alcohol, Ceteareth-20 (polyethylene glycol ether of cetearyl alcohol), glyceryl stearate, stearic acid, Euxyl® PE 9010 (phenoxyethanol/ethylhexylglycerin), Tween 80 (polysorbate 80, polyoxyethylene sorbitan monooleate) and coconut oil.

19. A method of treating pain from a disease in a subject in need thereof, the method comprising administration to the subject an effective amount of a solid form of claim 1.

20. A method of treating pain from a disease in a subject in need thereof, the method comprising administering to the subject an effective amount of a pharmaceutical composition of claim 10.

21. The method of claim 19, wherein the disease is selected from the group consisting of post-herpetic neuralgia, diabetic neuropathy, diabetic foot pain due to neuropathy, metatarsalgia, gout, hallux rigidus, cannabis or cannabinoid hyperemesis syndrome, postmastectomy pain syndrome, oral neuropathic pain, trigeminal neuralgia, a temporomandibular joint disorder, a hand and knee joint disorder, a synovitis, a meniscal tear, an anterior and posterior cruciate ligament tear or dislocation, a tendonitis, pain from hip and vertebrae disorders, a hernia, a fibromyalgia, a cluster headache, a dermatological condition, a contact dermatitis, Stevens-Johnson Syndrome, a pain and itch from other inflammatory foci due to a dermatological condition, a cutaneous condition, an erythema, and combinations thereof.

22. The method of claim 19, wherein the disease is selected from the group consisting of post-herpetic neuralgia, shingles, post-mastectomy pain syndrome, oral neuropathic pain, trigeminal neuralgia, a temporomandibular joint disorder, pruritus, uremic pruritus, a cluster headache, dental pain, osteoarthritis, rheumatoid arthritis, psoriatic arthritis, arthritis pain in neck, hand or finger, stenosing tenosynovitis, dystrophia of knee, hip, ankle or wrist, carpal tunnel, rhinopathy, oral mucositis, a cutaneous allergy, detrusor hyperreflexia, pain due to anti-cancer chemotherapy, lone pain/hematuria syndrome, neck pain, pain due to multiple sclerosis, amputation stump pain, reflex sympathetic dystrophy, complex regional pain syndrome (Type II; causalgia), allodynia, idiopathic pain, pain due to skin tumor, pain from spinal cord injury, pain from podiatric injury, pain from fracture, pain from dislocation, and combinations thereof.

23. The method of claim 19, wherein the administration is a topical, oral, injectable, or electrophoretic route of application.

24. The method of claim 19, further comprising administering to the subject an additional therapeutic agent, a secondary therapy, or a combination thereof.

25. The method of claim 19, further comprising administering to the subject a radiation therapy, a surgical therapy, an immunotherapy, gene therapy, a chemotherapeutical agent, a non-steroidal anti-inflammatory agent, and combinations thereof.

26. The method of claim 20, wherein the disease is selected from the group consisting of post-herpetic neuralgia, diabetic neuropathy, diabetic foot pain due to neuropathy, metatarsalgia, gout, hallux rigidus, cannabis or cannabinoid hyperemesis syndrome, postmastectomy pain syndrome, oral neuropathic pain, trigeminal neuralgia, a temporomandibular joint disorder, a hand and knee joint disorder, a synovitis, a meniscal tear, an anterior and posterior cruciate ligament tear or dislocation, a tendonitis, pain from hip and vertebrae disorders, a hernia, a fibromyalgia, a cluster headache, a dermatological condition, a contact dermatitis, Stevens-Johnson Syndrome, a pain and itch from other inflammatory foci due to a dermatological condition, a cutaneous condition, an erythema, and combinations thereof.

27. The method of claim 20, wherein the disease is selected from the group consisting of post-herpetic neuralgia, shingles, post-mastectomy pain syndrome, oral neuropathic pain, trigeminal neuralgia, a temporomandibular joint disorder, pruritus, uremic pruritus, a cluster headache, dental pain, osteoarthritis, rheumatoid arthritis, psoriatic arthritis, arthritis pain in neck, hand or finger, stenosing tenosynovitis, dystrophia of knee, hip, ankle or wrist, carpal tunnel, rhinopathy, oral mucositis, a cutaneous allergy, detrusor hyperreflexia, pain due to anti-cancer chemotherapy, lone pain/hematuria syndrome, neck pain, pain due to multiple sclerosis, amputation stump pain, reflex sympathetic dystrophy, complex regional pain syndrome (Type II; causalgia), allodynia, idiopathic pain, pain due to skin tumor, pain from spinal cord injury, pain from podiatric injury, pain from fracture, pain from dislocation, and combinations thereof.

28. The method of claim 20, wherein the administration is a topical, oral, injectable, or electrophoretic route of application.

29. The method of claim 20, further comprising administering to the subject an additional therapeutic agent, a secondary therapy, or a combination thereof.

30. The method of claim 20, further comprising administering to the subject a radiation therapy, a surgical therapy, an immunotherapy, gene therapy, a chemotherapeutical agent, a non-steroidal anti-inflammatory agent, and combinations thereof.

* * * * *